United States Patent
Shi et al.

(10) Patent No.: US 11,115,901 B2
(45) Date of Patent: Sep. 7, 2021

(54) NETWORK ACCESS METHOD, NETWORK DEVICE, AND TERMINAL

(71) Applicant: HUAWEI TECHNOLOGIES CO., LTD., Shenzhen (CN)

(72) Inventors: Xiaoli Shi, Shanghai (CN); Kaijie Zhou, Shenzhen (CN); Min Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 16/675,147

(22) Filed: Nov. 5, 2019

(65) Prior Publication Data

US 2020/0077321 A1 Mar. 5, 2020

Related U.S. Application Data

(63) Continuation of application No. PCT/CN2018/085739, filed on May 4, 2018.

(30) Foreign Application Priority Data

May 5, 2017 (CN) .......................... 201710310534.8

(51) Int. Cl.
*H04W 48/04* (2009.01)
*H04W 76/14* (2018.01)
(Continued)

(52) U.S. Cl.
CPC .......... *H04W 48/04* (2013.01); *B64C 39/024* (2013.01); *H04W 8/18* (2013.01);
(Continued)

(58) Field of Classification Search
CPC .. G08G 5/0069; G08G 5/0008; G08G 5/0013; G08G 5/006; G08G 5/0043;
(Continued)

(56) References Cited

U.S. PATENT DOCUMENTS 9,044,543 B2* 6/2015 Levien ................. B64C 39/024
10,860,953 B2* 12/2020 Karatekeli ............ H04L 63/102
(Continued)

FOREIGN PATENT DOCUMENTS

| CN | 102104927 A | 6/2011 |
| CN | 103781090 A | 5/2014 |

(Continued)

OTHER PUBLICATIONS

LG Electronics: "Potential enhancements to LTE for aerial vehicles",3GPP Draft; R1-1704855,2 Apr. 2017,total 3 pages.
(Continued)

*Primary Examiner* — Jung Liu
(74) *Attorney, Agent, or Firm* — Rimon PC

(57) ABSTRACT

This application discloses a network access method, a network device, and a terminal. The method includes: obtaining, by a network device, indication information, where the indication information is used to indicate whether the terminal supports air communication; and when the indication information indicates that the terminal supports the air communication, determining, by the network device, that the terminal is allowed to access a network in which the network device is located. In this application, a quantity of unmanned aerial vehicle terminals that access the network can be limited, reducing interference caused by the unmanned aerial vehicle terminals to another terminal in the same network as the unmanned aerial vehicle terminals, and improving communication quality of the another terminal.

20 Claims, 9 Drawing Sheets

(51) Int. Cl.
*H04W 76/11* (2018.01)
*B64C 39/02* (2006.01)
*H04W 8/18* (2009.01)
*H04W 28/02* (2009.01)
*H04W 48/16* (2009.01)
*H04W 72/04* (2009.01)

(52) U.S. Cl.
CPC ....... *H04W 28/0215* (2013.01); *H04W 48/16* (2013.01); *H04W 72/048* (2013.01); *H04W 76/11* (2018.02); *H04W 76/14* (2018.02)

(58) Field of Classification Search
CPC .. G08G 5/0021; G08G 5/0034; G08G 5/0082; G08G 5/0091; H04W 88/04; B64C 39/024; B64C 2201/128; B64C 2201/122; B64C 2201/20; B64C 2201/143; B64C 2201/126; B64C 2201/066; B64C 2201/042; B64C 2201/145; B64C 2201/121; B64C 2201/08; B64C 2201/206; B64C 2201/205; B64C 2201/208; B64C 2201/082; G05D 1/104; H04B 7/18504; H04B 7/18506; B64F 1/222; G06Q 10/08
See application file for complete search history.

(56) References Cited

U.S. PATENT DOCUMENTS

| | | | |
|---|---|---|---|
| 10,866,597 B1 * | 12/2020 | Reinhold | B64D 47/08 |
| 10,880,465 B1 * | 12/2020 | Svendsen | H04N 5/23219 |
| 2009/0111460 A1 | 4/2009 | Bosch et al. | |
| 2016/0330771 A1 | 11/2016 | Tan | |
| 2016/0340006 A1 * | 11/2016 | Tang | B64C 39/024 |
| 2016/0364989 A1 * | 12/2016 | Speasl | G08G 5/0082 |
| 2017/0053169 A1 * | 2/2017 | Cuban | B64C 39/024 |
| 2017/0069214 A1 * | 3/2017 | Dupray | G08G 5/0013 |
| 2017/0092109 A1 * | 3/2017 | Trundle | B60L 53/305 |
| 2017/0124884 A1 | 5/2017 | Shaw et al. | |
| 2017/0208489 A1 * | 7/2017 | Djordjevic | H04W 24/08 |
| 2018/0049407 A1 * | 2/2018 | Castelli | B64D 47/08 |
| 2018/0114451 A1 * | 4/2018 | Foina | G08G 5/0069 |
| 2018/0129881 A1 * | 5/2018 | Seeber | B64C 39/024 |
| 2018/0218619 A1 * | 8/2018 | Brown | H04W 12/062 |
| 2018/0324662 A1 * | 11/2018 | Phuyal | H04B 7/15 |
| 2018/0327091 A1 * | 11/2018 | Burks | B64C 39/10 |
| 2019/0103030 A1 * | 4/2019 | Banga | G08G 5/0013 |
| 2019/0208112 A1 * | 7/2019 | Kleinbeck | G08B 29/185 |
| 2020/0272827 A1 * | 8/2020 | Morrow | G08G 5/006 |
| 2021/0021981 A1 * | 1/2021 | Lauster | H04W 76/50 |

FOREIGN PATENT DOCUMENTS

| | | |
|---|---|---|
| CN | 105636042 A | 6/2016 |
| CN | 105939533 A | 9/2016 |
| WO | 2016007257 A1 | 1/2016 |
| WO | 2018204623 A1 | 11/2018 |

OTHER PUBLICATIONS

Huawei et al: "Potential enhancements for drones",3GPP Draft; R1-1704287,2 Apr. 2017,total 3 pages.

CATT; "Paging in Carrier Aggregation," 3GPP Draft R2-094320 , 3GPP TSG RAN WG2, Meeting #67, Aug. 24, 2009, Shenzhen, China, ,total 3 pages.

* cited by examiner

NETWORK ACCESS METHOD, NETWORK DEVICE, AND TERMINAL

CROSS-REFERENCE TO RELATED APPLICATIONS

This application is a continuation of International Application No. PCT/CN2018/085739, filed on May 4, 2018, which claims priority to Chinese Patent Application No. 201710310534.8, filed on May 5, 2017, The disclosures of the aforementioned applications are hereby incorporated by reference in their entireties.

TECHNICAL FIELD

This application relates to the field of communications technologies, and in particular, to a network access method, a network device, and a terminal.

BACKGROUND

With continuous development of an unmanned aerial vehicle technology, an unmanned aerial vehicle is more widely used. The unmanned aerial vehicles are widely used in fields, such as investigation, disaster rescue, wildlife observation, surveying and mapping, news reports, and electric power inspection. In addition, currently, the unmanned aerial vehicle may be connected to a cellular network, such as a long term evolution (Long Term Evolution, LTE for short) network, and can be used as user equipment (User Equipment, UE for short), to enrich a function of the unmanned aerial vehicle.

When the unmanned aerial vehicle communicates by using the cellular network, if the unmanned aerial vehicle flies at a low altitude, relative to an antenna height of a base station, the unmanned aerial vehicle behaves like conventional UE. Once a flight distance of the unmanned aerial vehicle is far higher than the antenna height of the base station, because the unmanned aerial vehicle at a high altitude and UE on the ground have different radio propagation characteristics, an uplink signal of the unmanned aerial vehicle may be transmitted in a plurality of cells, thereby causing interference to the conventional UE on the ground, such as a smartphone or an Internet of things device. More unmanned aerial vehicles in the air cause greater interference, reducing communication quality of the conventional UE.

SUMMARY

Embodiments of this application provide a network access method, a network device, and a terminal, to limit a quantity of unmanned aerial vehicle terminals that access a network.

According to a first aspect, this application provides a network access method, including:

obtaining, by a network device, indication information, where the indication information is used to indicate whether a terminal supports air communication; and when the indication information indicates that the terminal supports the air communication, determining, by the network device, that the terminal is allowed to access a network in which the network device is located.

Optionally, the network device may be a base station, or the network device may be a device in a core network, such as a mobility management entity (mobility Management Element, MME for short). The indication information may include at least one type of information of the terminal, such as capability information, a flight certificate, a sequence, and subscription information.

In some possible designs, the indication information may include the capability information of the terminal. The obtaining, by a network device, indication information may be specifically: receiving, by the network device, the capability information from the terminal, where the capability information may be used to indicate that the terminal supports the air communication.

In some possible designs, the indication information may include a sequence. The obtaining, by a network device, indication information may be specifically: receiving, by the network device, the sequence from the terminal, where the sequence is used to indicate whether the terminal is an unmanned aerial vehicle terminal that supports the air communication. Further, when the sequence indicates that the terminal is the unmanned aerial vehicle terminal that supports the air communication, the network device may determine that the terminal supports the air communication.

In some possible designs, the indication information may include a flight certificate. The obtaining, by a network device, indication information may be specifically: detecting, by the network device, whether the terminal has the flight certificate, where the flight certificate is used to authorize communication of the terminal in a space domain. Further, when the terminal has the flight certificate, the network device may determine that the terminal supports the air communication.

In some possible designs, the indication information may include subscription information. The obtaining, by a network device, indication information may be specifically: detecting, by the network device, whether the terminal has the subscription information in the network in which the network device is located. Further, when the terminal has the subscription information, the network device may determine that the terminal supports the air communication.

In some possible designs, the space domain location area and the ground location area have different location area identities. The indication information may include a location area identity. The obtaining, by a network device, indication information may be specifically: when the terminal performs cell handover, obtaining, by the network device, a location area identity of a source cell before the terminal performs cell handover. Further, when the location area identity of the source cell indicates that the source cell is the space domain location area, the network device determines that the terminal supports the air communication. Optionally, the location area identity may be a tracking area identity (Tracking Area ID, TAI for short), a routing area identity, or the like.

In other words, the network device may determine, when obtaining the capability information of the terminal that is used to indicate that the terminal supports the air communication, or when learning that the terminal has the flight certificate, or learning that the terminal has the subscription information in the current network, or when determining that the identity of the source cell before the terminal performs cell handover is an identity of the space domain location area, that the terminal supports the air communication. Further, the network device may determine that the terminal is allowed to access the network in which the network device is located, that is, the current network, so that the terminal may communicate by using the current network.

In some possible designs, a type of indication information that is used to determine whether a terminal is allowed to access the network, or that is used to determine whether a terminal supports air communication, may be obtained through preconfiguration, for example, agreed on in advance by using a protocol. Alternatively, the type of indication information may further be notified to a terminal by a network device such as a base station. For example, the network device may dynamically or semi-statically notify, by using signaling, the terminal to report a type of indication information, for example, notify the terminal to report the capability information, so that the network device may determine, based on the type of indication information, whether the terminal is allowed to access the network.

Further, if it is determined, based on the indication information, that the terminal does not support the air communication, the network device may further determine, with reference to other information, whether the terminal is prohibited from accessing the network, for example, perform determining with reference to height information of the terminal or with reference to a location area identity of a location of the terminal.

In some possible designs, the network device may further obtain height information of the terminal. When a height value indicated by the height information exceeds a preset height threshold, and the indication information indicates that the terminal does not support the air communication, the network device may determine that the terminal is prohibited from accessing the network in which the network device is located. Optionally, the height value indicated by the height information may be an absolute height, or may be a relative height. For example, the height value may be a height value of the terminal from the ground, a height value of the terminal relative to a base station, or a height value of the terminal relative to another reference object. Therefore, the network device may determine, based on the indication information and the height information, whether the terminal is prohibited from accessing the network, to limit a quantity of terminals that access the network, such as unmanned aerial vehicle terminals, and to ensure performance of a conventional ground terminal.

In some possible designs, the space domain location area and the ground location area have different location area identities. The network device may further obtain a location area identity of a location of the terminal. When the location area identity indicates that the location of the terminal is in the space domain location area, and the indication information indicates that the terminal does not support air communication, the network device may determine that the terminal is prohibited from accessing the network in which the network device is located. Optionally, that the space domain location area and the ground location area have different location area identities may be that a space domain cell and a ground cell have different location area identities, or may be that the space domain location area and the ground location area that are in one cell have different location area identities, that is, the space domain location area may be the space domain cell or the space domain location area in a cell. Therefore, the network device may determine, based on the indication information and the location area identity, whether the terminal is prohibited from accessing the network, to limit a quantity of terminals that access the network, such as unmanned aerial vehicle terminals, and to ensure performance of a conventional ground terminal.

According to a second aspect, this application further provides a network access method, including:

sending, by a terminal, indication information to a network device, where the indication information is used to indicate whether the terminal supports air communication; and requesting, by the terminal, to access a network in which the network device is located.

In some possible designs, the terminal may further send height information to the network device. When a height value indicated by the height information exceeds a preset height threshold, and the indication information indicates that the terminal does not support the air communication, the terminal is prohibited from accessing the network in which the network device is located.

In some possible designs, the terminal may further send a location area identity of a location of the terminal to the network device. When the location area identity indicates that the location of the terminal is in a space domain location area, and the indication information indicates that the terminal does not support the air communication, the terminal is prohibited from accessing the network in which the network device is located. Optionally, the location area identity may be a TAI, a routing area identity, or the like.

In some possible designs, the sending, by a terminal, indication information to a network device may be specifically: sending, by the terminal, a sequence to the network device, where the sequence is used to indicate whether the terminal is an unmanned aerial vehicle terminal that supports the air communication.

In some possible designs, the sending, by a terminal, indication information to a network device may be specifically: sending, by the terminal, capability information to the network device, where the capability information is used to indicate that the terminal supports the air communication.

In some possible designs, the sending, by a terminal, indication information to a network device may be specifically: sending, by the terminal, a flight certificate to the network device, where the flight certificate is used to authorize communication of the terminal in a space domain.

In some possible designs, in a cell handover scenario, the terminal may further send, to the network device, a location area identity of a source cell before the terminal performs cell handover. Further, when the location area identity of the source cell indicates that the source cell is the space domain location area, it indicates that the terminal supports the air communication.

In other words, the terminal may send indication information of the terminal to the network device, to indicate whether the terminal has a capability of the air communication, so that the network device may determine, based on the indication information, whether the terminal is allowed to access the network, and the terminal that supports the air communication can access the network. Further, a terminal that does not support the air communication may further report height information or a location area identity of a location of the terminal, so that the network device further determines whether the terminal can access the network. This limits a quantity of terminals that access the network, such as unmanned aerial vehicle terminals, to ensure performance of a conventional ground terminal.

According to a third aspect, this application further provides a network device. The network device includes an obtaining unit and a processing unit. The network device implements, by using the foregoing units, some or all of the steps performed by the network device in the network access method in the first aspect.

According to a fourth aspect, this application further provides a terminal. The terminal includes a transceiver unit and a requesting unit. The terminal implements, by using the foregoing units, some or all of the steps performed by the terminal in the network access method in the second aspect.

According to a fifth aspect, this application further provides a computer storage medium, where the computer storage medium stores a program. When being executed, the program includes some or all of the steps performed by the network device in the network access method in the first aspect.

According to a sixth aspect, this application further provides a computer storage medium, where the computer storage medium stores a program. When being executed, the program includes some or all of the steps performed by the terminal in the network access method in the second aspect.

According to a seventh aspect, this application further provides a network device, including a transceiver and a processor. The processor is connected to the transceiver. The processor is configured to perform some or all of the steps performed by the network device in the network access method in the first aspect.

According to an eighth aspect, this application further provides a terminal, including a transceiver and a processor. The processor is connected to the transceiver. The processor is configured to perform some or all of the steps performed by the terminal in the network access method in the second aspect.

According to a ninth aspect, this application further provides a network access system, including a network device and a terminal. The network device is configured to perform some or all of the steps performed by the network device in the network access method in the first aspect. The terminal is configured to perform some or all of the steps performed by the terminal in the network access method in the second aspect.

According to a tenth aspect, this application further provides a computer program product that includes an instruction. When the computer program product is run on a computer, the computer is enabled to perform the methods in the foregoing aspects.

In this application, the network device may determine, by obtaining the indication information that is used to indicate whether the terminal supports the air communication, and when the indication information indicates that the terminal supports the air communication, that an identity of the terminal is valid, that is, determine that the terminal is allowed to access the network in which the network device is located, so that the network device may determine, based on the indication information, whether the terminal is allowed to communicate in the space domain. The quantity of unmanned aerial vehicle terminals that access the network is limited, reducing interference caused by the unmanned aerial vehicle terminals to another terminal in the same network as the unmanned aerial vehicle terminals, and improving communication quality of the another terminal.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

Figure 1:
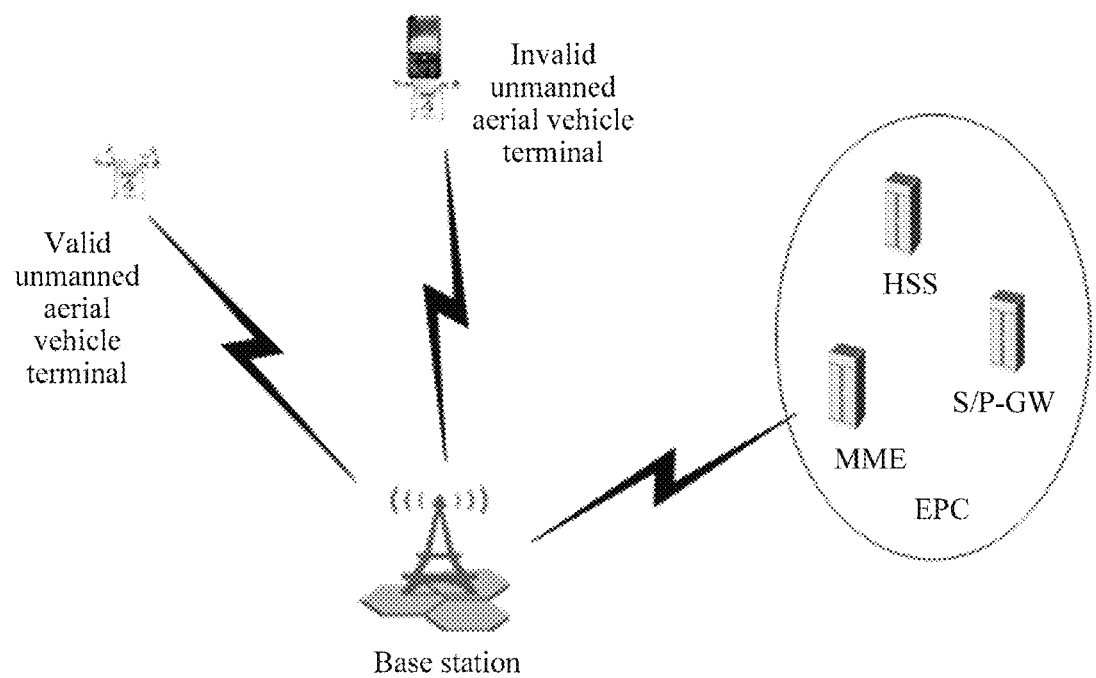
FIG. 1 is an architectural diagram of a communications system according to an embodiment of this application.

The following describes the embodiments of this application with reference to the accompanying drawings in the embodiments of this application.

It should be understood that the technical solutions of this application may be specifically applied to various communications networks, for example, a global system for mobile communications (Global Systems for Mobile communications, GSM for short), code division multiple access (Code Division Multiple Access, CDMA for short), wideband code division multiple access (Wideband Code Division Multiple Access, WCDMA for short), time division-synchronous code division multiple access (Time Division-Synchronous Code Division Multiple Access, TD-SCDMA for short), a universal mobile telecommunications system (Universal Mobile Telecommunication System, UMTS for short), a long term evolution (Long Term Evolution, LTE for short) network. With continuous development of communications technologies, the technical solutions of this application may be further used in future networks, for example, a fifth generation mobile communication technology (The Fifth Generation Mobile Communication Technology, 5G for short) network, which may also be referred to as a new radio (New Radio, NR for short) network, or may be used in a D2D (device to device) network, an M2M (machine to machine) network, or the like.

The network device in this application may be a base station; or may be a transmission point (Transmission point, TP for short), a transmission and receiver point (transmission and receiver point, TRP for short), a relay device, or another network device that has a base station function; or may be a mobility management entity (Mobile Management Element Management Element, MME for short), a home subscriber server (Home Subscriber Server, HSS for short), or the like in a core network. This is not limited in this application.

In this application, a terminal (terminal) may also be referred to as user equipment (User Equipment, UE for short), a mobile station (Mobile Station, MS for short), a mobile terminal (mobile terminal), a subscriber unit (Subscriber Unit, SU for short), a subscriber station (Subscriber Station, SS for short), a mobile station (Mobile Station, MS for short), a remote station (Remote Station, RS for short), an access point (Access Point, AP for short), a remote terminal (Remote Terminal, RT for short), an access terminal (Access Terminal, AT for short), a user terminal (User Terminal, UT for short), a user agent (User Agent, UA for short), a terminal device (User Device, UD for short), or the like. This is not limited in this application. The terminal may be a wireless terminal or a wired terminal. The wireless terminal may be a device that provides voice and/or data connectivity to a user, and may communicate with one or more core networks by using a radio access network (such as a RAN, radio access network). For example, the terminal may be an unmanned aerial vehicle terminal, and the unmanned aerial vehicle terminal is also referred to as drone UE, and includes an unmanned aerial vehicle (Unmanned Aerial Vehicle, UAV), or an unmanned aerial vehicle that carries a conventional ground terminal (for example, conventional UE is placed on the unmanned aerial vehicle).

In this application, the base station may be a device that communicates with a terminal by using one or more sectors on an air interface in an access network, and may coordinate attribute management of the air interface. For example, the base station may be a base station in GSM or CDMA, such as a base transceiver station (Base Transceiver Station, BTS for short); may be a base station in WCDMA, such as a NodeB; may be an evolved NodeB in LTE, such as an eNB or an e-NodeB (evolutional Node B); may be a base station in a 5G system, such as a gNB; may be a base station device in another new communications system, or the like. This is not limited in this application. Further optionally, the base station may be a dedicated station, or may be a common station. The dedicated station may be a base station dedicated for communication with an unmanned aerial vehicle terminal. The dedicated station has two antenna devices, which point to the sky and the ground respectively, that is, a cell covered by a space domain and a cell covered by the ground may be two cells. In addition, the dedicated station is also compatible with functions and performance of a common ground base station, and can use a dedicated spectrum for operating an unmanned aerial vehicle. The common station may be a base station that has functions and performance of the common ground base station, and also has a complete communication capability of the unmanned aerial vehicle terminal. Optionally, the base station space domain coverage area and the ground coverage area may also be in different location areas of one cell, including a space domain location area and a ground location area.

The following describes an application scenario of this application by using an example in which a terminal is an unmanned aerial vehicle terminal. FIG. 1 is an architectural diagram of a communications system according to an embodiment of this application. Specifically, as shown in FIG. 1, the communications system includes a base station, an unmanned aerial vehicle terminal, and core network devices. An LTE network is used as an example. A device in an LTE evolved packet core (E-utran Packet Core, EPC for short) may include an MME, a serving gateway/PDN gateway (Serving/Public Data Network gateway, S/P-GW for short), and an HSS. The unmanned aerial vehicle terminal may request to connect to a network in which the base station and the core network are located, to communicate by using the network.

Optionally, the unmanned aerial vehicle terminal may be a valid unmanned aerial vehicle terminal, for example, an unmanned aerial vehicle equipped with an air authenticated cellular module. The valid unmanned aerial vehicle terminal is allowed to access a network. In addition, the unmanned aerial vehicle terminal may also be an invalid (that is, not valid) unmanned aerial vehicle terminal, for example, an unmanned aerial vehicle equipped with a cellular module but only authenticated by a ground operation. The invalid unmanned aerial vehicle terminal is prohibited from accessing the network. To reduce interference of an unmanned aerial vehicle terminal to another terminal in the same network, improve communication quality of another terminal, ensure performance of another terminal such as conventional ground UE, improve security of data transmission, and the like, admission of an unmanned aerial vehicle in the air needs to be limited. To be specific, a quantity of unmanned aerial vehicles that access a network is limited, for example, the invalid unmanned aerial vehicle terminal is prohibited from accessing the network, and the valid unmanned aerial vehicle terminal is allowed to access the network.

Figure 2A:
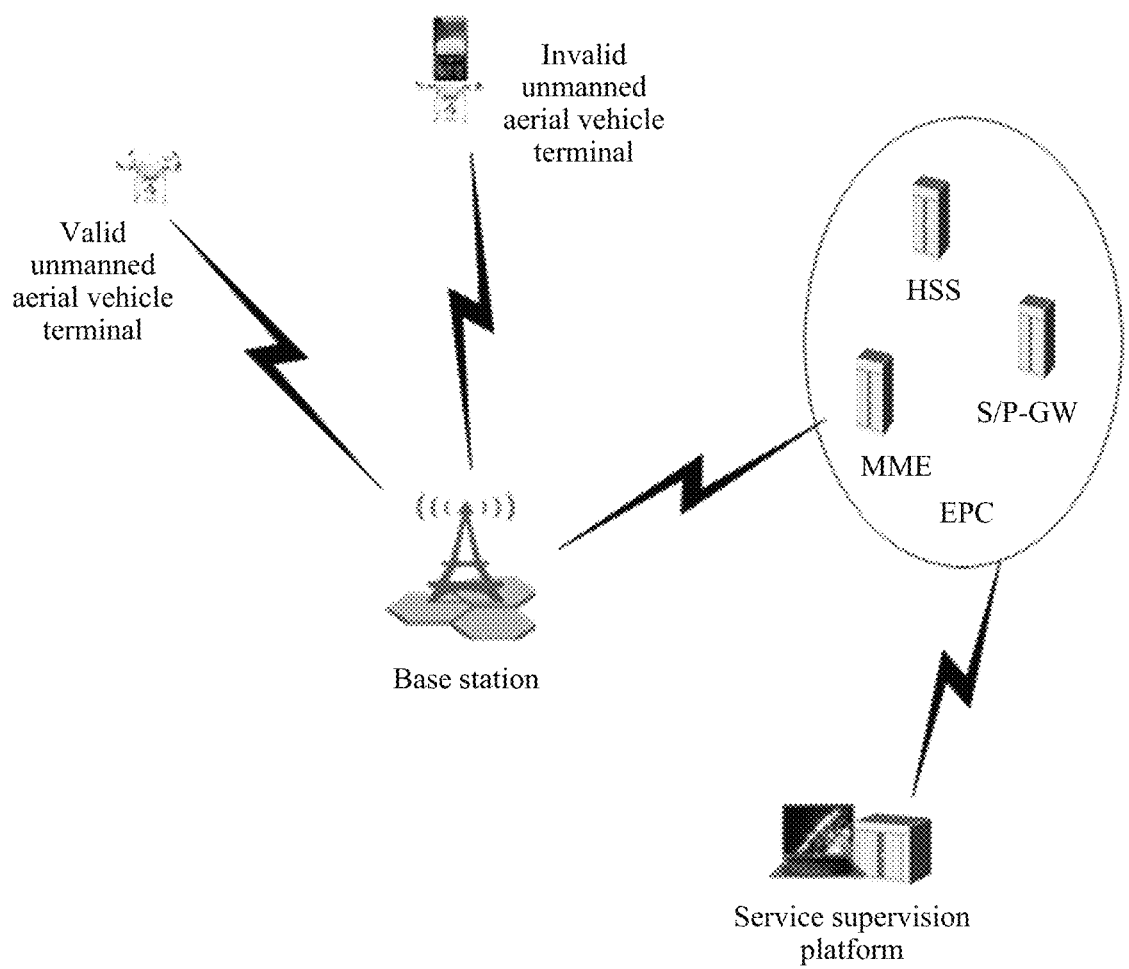
FIG. 2a is a schematic diagram of a deployment location of a supervision platform according to an embodiment of this application.
Figure 2B:
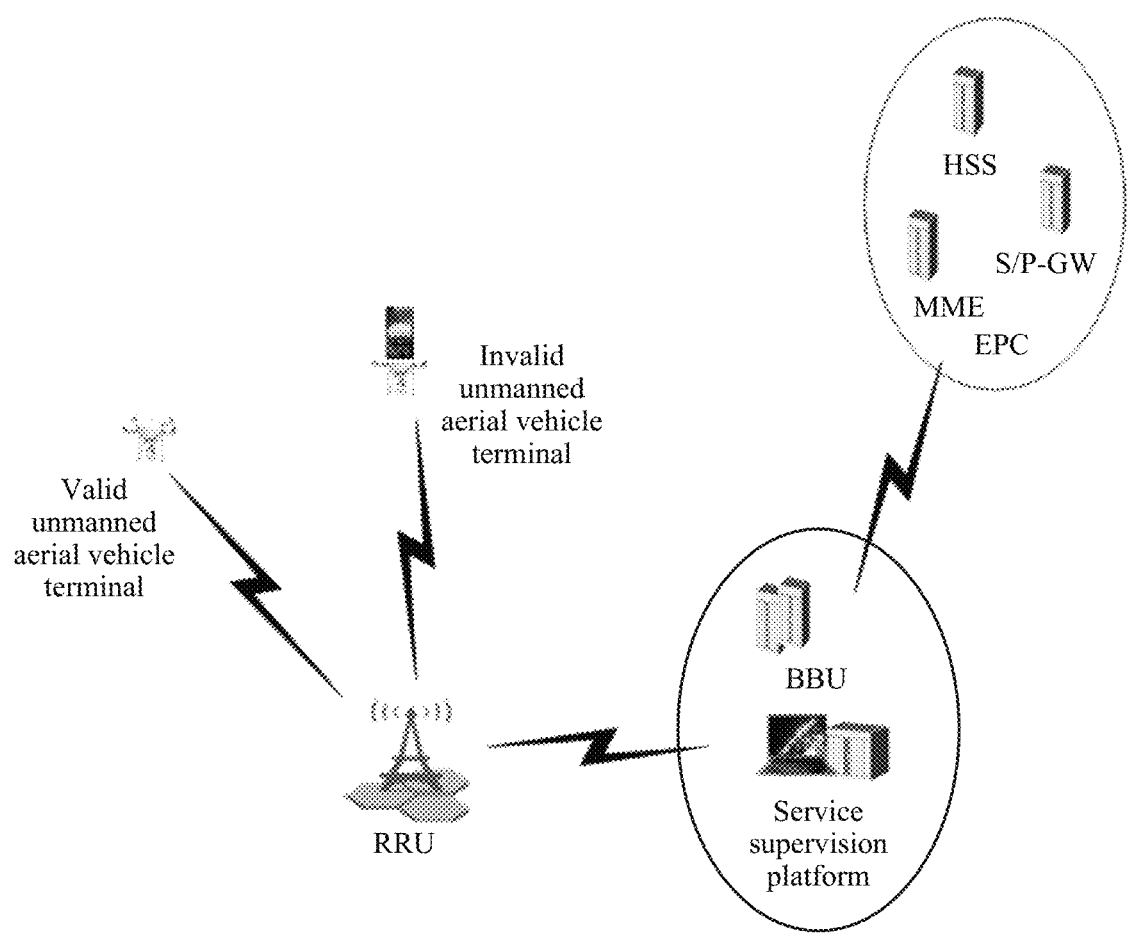
FIG. 2b is a schematic diagram of a deployment location of another supervision platform according to an embodiment of this application.
Figure 2C:
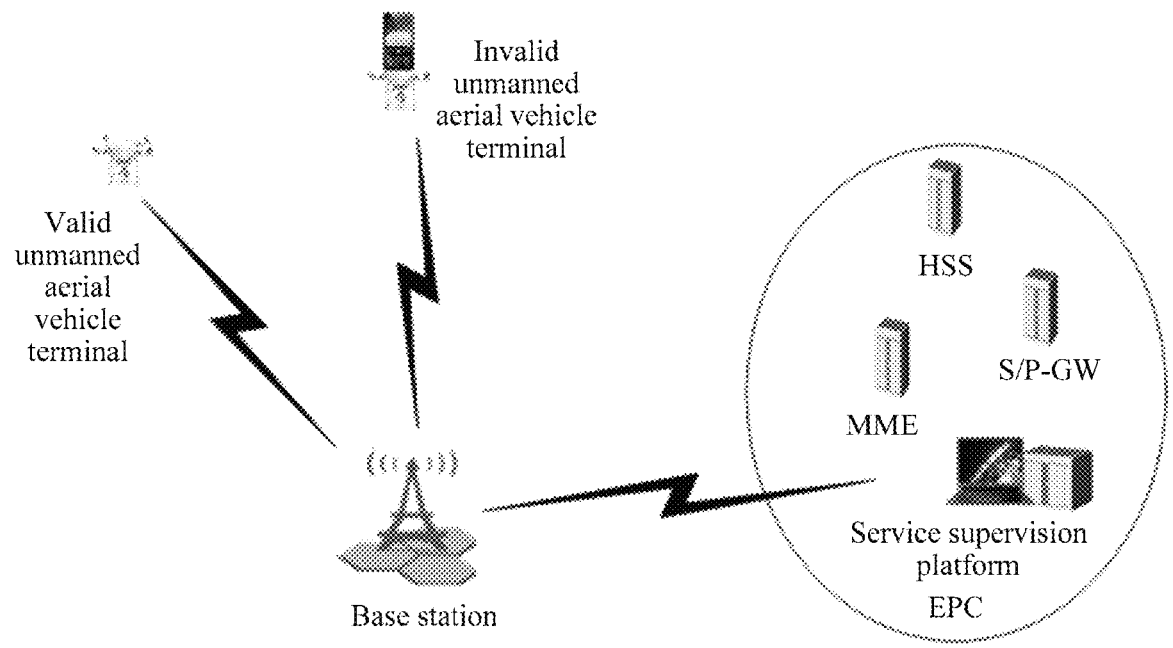
FIG. 2c is a schematic diagram of a deployment location of still another supervision platform according to an embodiment of this application.

Further optionally, the unmanned aerial vehicle terminal may apply to a service supervision platform in advance for an air communication capability. After the application is approved, the service supervision platform may configure, for the unmanned aerial vehicle terminal, a valid identity indicating that the unmanned aerial vehicle terminal has the air communication capability, where the valid identity may be a flight certificate, a special identity, or the like; or the unmanned aerial vehicle terminal has a special capability, for example, the unmanned aerial vehicle terminal has the air communication capability; or a special sequence is allocated to the unmanned aerial vehicle terminal when the unmanned aerial vehicle terminal accesses the network; or the unmanned aerial vehicle terminal has valid subscription information in a core network, to indicate that the unmanned aerial vehicle terminal supports the air communication. The service supervision platform may be an organization that allocates the identity to the unmanned aerial vehicle terminal, and can monitor the unmanned aerial vehicle terminal in a space domain. Optionally, as shown in FIG. 2a, the service supervision platform may be independently deployed. A monitoring result and a configuration result may be forwarded by using an internet, or may be forwarded to a base station or another network device by using a transparent channel, such as a transport layer security (Transport Layer Security, TLS for short) protocol. Alternatively, as shown in FIG. 2b, the service supervision platform may be further deployed on a base station side. For example, when the base station is divided into a remote radio unit (Remote Radio Unit, RRU for short) and a baseband processing unit (Baseband Unit, BBU for short), the service supervision platform may be specifically deployed on the BBU side, so that a monitoring result and a configuration result may be directly exchanged with the base station, real-time performance of reporting the monitoring result and the configuration result is better, and distributed management of the base station of an unmanned aerial vehicle is facilitated. Alternatively, as shown in FIG. 2c, the service supervision platform may be further deployed in a core network, so that a monitoring result and a configuration result may be reported to the core network for processing by the core network, so that real-time performance of reporting the monitoring result and the configuration result is better. A deployment location of the service supervision platform is not limited in this application.

Figure 3:
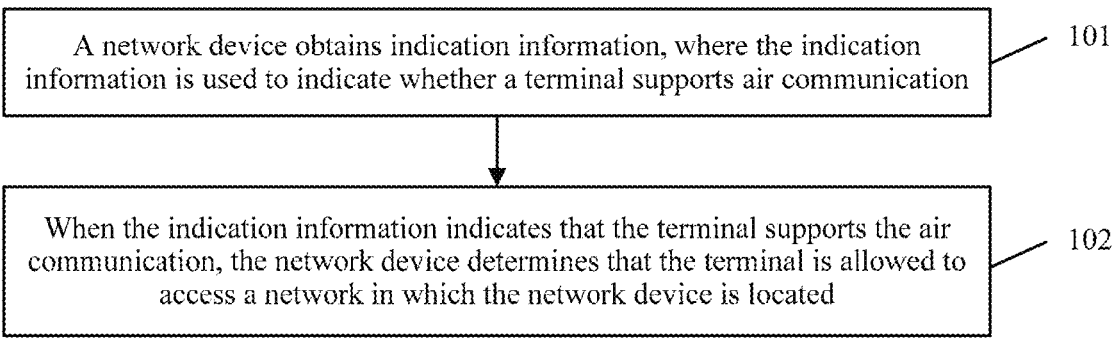
FIG. 3 is a schematic flowchart of a network access method according to an embodiment of this application.

FIG. 3 is a schematic flowchart of a network access method according to an embodiment of this application;

Specifically, as shown in FIG. 3, the network access method in this embodiment of this application may include the following steps.

101. A network device obtains indication information, where the indication information is used to indicate whether a terminal supports air communication.

The indication information may include at least one type of information of the terminal, such as capability information, a flight certificate, a sequence, and subscription information. The network device may be a base station, or may be a core network device such as an MME. This is not limited in this application.

Optionally, the indication information includes the capability information of the terminal. That a network device obtains indication information may be specifically: The network device receives the capability information from the terminal, where the capability information is used to indicate that the terminal supports the air communication. Alternatively, the network device may further receive the capability information of the terminal from another device. For example, when the network device is a base station, the base station may further receive the capability information of the terminal that is obtained and sent by the core network device such as the MME.

Optionally, the indication information includes a sequence. That a network device obtains indication information may be specifically: The network device receives a sequence from the terminal, where the sequence is used to indicate whether the terminal is an unmanned aerial vehicle terminal that supports the air communication. Further, when the sequence indicates that the terminal is the unmanned aerial vehicle terminal that supports the air communication, the network device may determine that the terminal supports the air communication.

Optionally, the indication information includes the flight certificate. That a network device obtains indication information may be specifically: The network device detects whether the terminal has the flight certificate, where the flight certificate is used to authorize communication of the terminal in a space domain. Further, when the terminal has the flight certificate, the network device may determine that the terminal supports the air communication. Further optionally, the flight certificate may be obtained through prior application, for example, by applying to the service supervision platform. Alternatively, the flight certificate may also be obtained in another manner. The service supervision platform may be independently deployed, may be deployed on a base station side, or may be deployed on a core network side, as shown in FIG. 2a to FIG. 2c.

Optionally, the indication information includes subscription information. That a network device obtains indication information may be specifically: The network device detects whether the terminal has subscription information in a network in which the network device is located. Further, when the terminal has the subscription information, the network device may determine that the terminal supports the air communication. Optionally, the subscription information may include a special UE identity. The identity may be associated with packet data network (Packet Data Network, PDN for short) subscription content, or the UE identity may be international mobile subscriber identity (International Mobile Subscriber Identity, IMSI for short) information, or the like. This is not limited in this application.

Optionally, in different scenarios in which the space domain location area and the ground location area have different location area identities, if the terminal performs cell handover, that a network device obtains indication information may be specifically: The network device obtains a location area identity of a source cell before the terminal performs cell handover. Further, when the location area identity of the source cell indicates that the source cell is the space domain location area, the network device may determine that the terminal supports the air communication. Further optionally, the location area identity may be a tracking area identity (Tracking Area ID, TAI for short), a routing area identity, or the like.

Further optionally, a type of indication information that is used to determine whether a terminal is allowed to access the network, or that is used to determine whether the terminal supports the air communication, may be obtained through preconfiguration, for example, agreed on in advance by using a protocol. Alternatively, a type of the indication information may further be notified to a terminal by a network device such as a base station. For example, the network device may dynamically or semi-statically notify, by using signaling, the terminal to report a type of indication information, for example, notify the terminal to report the capability information, so that the network device may determine, based on the type of indication information, whether the terminal is allowed to access the network.

102. When the indication information indicates that the terminal supports the air communication, the network device determines that the terminal is allowed to access a network in which the network device is located.

Specifically, if the indication information indicates that the terminal supports the air communication, the network device may determine that the terminal is allowed to access the network in which the network device is located, namely, a current network, so that the terminal can communicate by using the current network.

Further optionally, if it is determined, based on the indication information, that the terminal does not support the air communication, the network device may further determine, with reference to other information, whether an identity of the terminal is valid, for example, perform determining with reference to height information of the terminal or with reference to a location area identity of a location of the terminal.

In an optional implementation, the network device may further obtain height information of the terminal, and may compare the height information with a preset height threshold. When a height value indicated by the height information exceeds the preset height threshold, and the indication information indicates that the terminal does not support the air communication, the network device may determine that the identity of the terminal is invalid, and determine that the terminal is prohibited from accessing the current network. Optionally, the height information may be sent by the terminal to the network device. For example, the terminal may add the height information to an attach request and send the attach request to the network device. Alternatively, the height information may be obtained through measurement by the network device such as a base station. This is not limited in this application.

Optionally, the height value indicated by the height information may be an absolute height, or may be a relative height. For example, the height value may be a height value of the terminal from the ground, a height value of the terminal relative to a base station, a height value of the terminal relative to another reference object. This is not limited in this application. Further optionally, the height information is obtained by the terminal such as an unmanned aerial vehicle terminal by using a satellite positioning technology or by using another positioning technology. This is not limited in this application.

In an optional implementation, when a space domain location area and a ground location area have different location area identities, the network device may further obtain a location area identity of a location of the terminal. When the obtained location area identity is an identity of the space domain location area, that is, when the location area identity indicates that the location of the terminal is in the space domain location area, and the indication information indicates that the terminal does not support the air communication, the network device may determine that the identity of the terminal is invalid, and determine that the terminal is prohibited from accessing the current network.

Optionally, the space domain location area may be a space domain cell or a space domain location area in a cell. Correspondingly, the ground location area may be a ground cell or a ground location area in a cell. In other words, that the space domain location area and the ground location area have different location area identities may be that the space domain cell and the ground cell have different location area identities, or may be that the space domain location area and the ground location area that are in one cell have different location area identities. Further optionally, the location area identity may be obtained through preconfiguration, for example, may be configured by the network device such as a base station. A configuration message is sent to a terminal, and the location area identity may be included in the configuration message.

Optionally, the configuration message used in this embodiment of this application may be higher layer signaling such as a system message or a broadcast message, radio resource control (Radio Resource Control, RRC for short) signaling, or medium access control (Medium Access Control, MAC for short) signaling. Alternatively, optionally, the indication message may be physical layer signaling such as physical layer downlink control information (Downlink Control Information, DCI for short) signaling. This is not limited in this application.

In this application, the network device may obtain indication information that is used to indicate whether the terminal supports the air communication, and when the indication information indicates that the terminal supports the air communication, determine that the identity of the terminal is valid, that is, determine that the terminal is allowed to access the network in which the network device is located. Otherwise, the network device may further determine, with reference to height information of the terminal or a location area identity of the terminal, whether the identity of the terminal is valid, and when the identity of the terminal is invalid, determine that the terminal is prohibited from accessing the network. Therefore, the network device may determine, based on the indication information, whether the terminal is allowed to communicate in a space domain. The quantity of unmanned aerial vehicle terminals that access the network is limited, reducing interference caused by the unmanned aerial vehicle terminals to another terminal in the same network as the unmanned aerial vehicle terminals, and improving communication quality of the another terminal.

Figure 4:
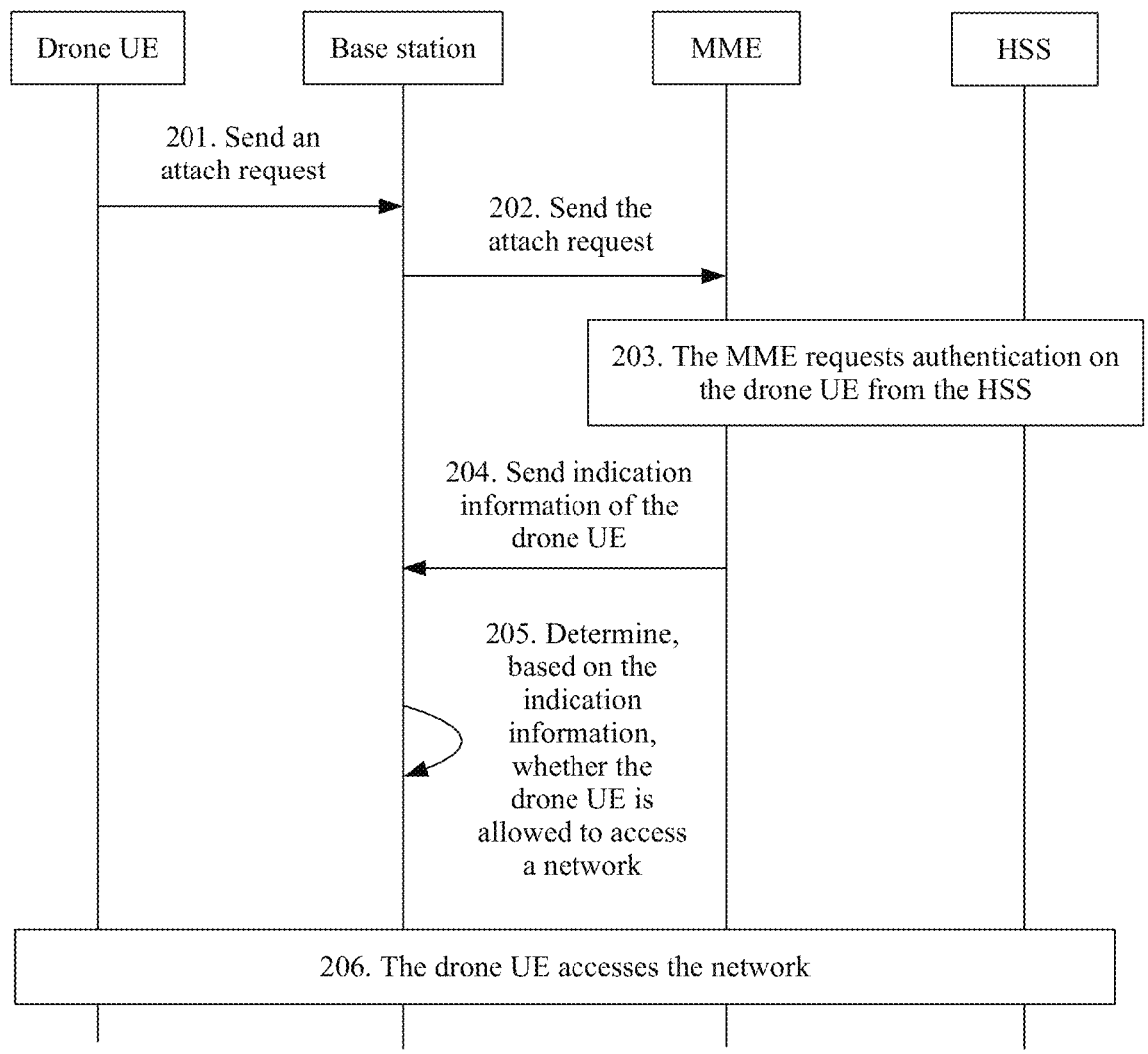
FIG. 4 is a schematic interaction diagram of a network access method according to an embodiment of this application.

FIG. 4 is a schematic interaction diagram of a network access method according to an embodiment of this application. Specifically, the following uses an example in which a terminal is an unmanned aerial vehicle terminal (also referred to as Drone UE), and a network device is a base station for detailed description. As shown in FIG. 4, the network access method in this embodiment of this application may include the following steps.

201. The drone UE sends an attach request to a base station.

When the terminal such as the drone UE needs to access a current network for communication, the terminal may establish a connection with the base station such as an eNB. Specifically, the drone UE may initiate a random access request to the base station. After receiving the request, the base station initiates an RRC connection setup (RRC connection setup) message to the drone UE. After receiving the RRC connection setup message, the drone UE may return an RRC connection setup complete (RRC connection setup complete) message to the base station. Optionally, the attach request (attach request) message may be included in the RRC connection setup complete message. The current network may be a network in which the base station is located.

202. The base station sends the attach request to an MME.

Specifically, after receiving the attach request message, the base station may forward the attach request message to a device such as the MME in a core network. Optionally, the forwarded attach request message may be included in an initial UE message sent by the base station to the MME. Further optionally, if a 5G NR system or another future system is used, and the core network may include another network element entity, the base station may further exchange information with the another network element entity. This is not limited in this application.

203. The MME requests authentication on the drone UE from an HSS.

Specifically, after receiving the attach request of the drone UE, the MME obtains an authentication vector from the HSS to which the user subscribes, and completes network authentication with the drone UE. In addition, a process such as security authentication is performed on the drone UE, and a location update process and a session establishment process may be performed after the authentication process and the security authentication process. For the authentication process, the security authentication process, the location update process, and the session establishment process, refer to related descriptions in the prior art. Details are not described herein again.

204. The MME sends indication information of the drone UE to the base station.

Optionally, after the processes such as the authentication process are completed, the MME may send the indication information of the drone UE to the base station, where the indication information may be used to indicate whether the drone UE supports air communication. For example, the indication information of the drone UE may be included in an attach accept (attach accept) message sent by the MME to the base station, to request to establish a radio resource. Further optionally, the attach accept message may be included in a control message, such as an initial context setup request (initial context setup request) message. In other words, a manner in which the base station obtains the indication information may be that the MME sends the indication information to the base station.

Optionally, the indication information includes at least one type of information of the drone UE, such as capability information, a flight certificate, and subscription information, and is used to indicate whether the drone UE supports the air communication.

Further optionally, the indication information includes the capability information of the drone UE, and the capability information may be used to indicate that the drone UE supports the air communication. Optionally, the capability information may be brought by the MME to the base station in the initial context setup request message.

Further optionally, the indication information includes the flight certificate. The flight certificate may be obtained through prior application, for example, by applying to the service supervision platform. Optionally, the service supervision platform may be independently deployed, may be deployed on a base station side, or may be deployed on a core network side, as shown in FIG. 2a to FIG. 2c. If the service supervision platform is an independent entity, the MME and/or the base station need/needs to have an interface with the service supervision platform. The interface may be a standardized interface, or may be a private interface, to query, by using the interface, whether the drone UE has a flight certificate, or to obtain the flight certificate of the drone UE. If the service supervision platform is on the core network, the MME may directly obtain the flight certificate of the drone UE. After obtaining the flight certificate, the MME may forward the flight certificate to the base station. If the service supervision platform is on the base station, the base station may directly obtain the flight certificate of the drone UE, and the like. This is not limited in this application.

Further optionally, the indication information includes subscription information. The subscription information may be stored in the HSS, and includes authentication data. The authentication data may include a subscription context of one or more PDNs. Optionally, the subscription information may be included in an authentication data response message sent by the HSS to the MME. Further, the subscription information may be brought by the MME to the base station in the initial context setup request message.

Further optionally, the base station may further receive indication information of the drone UE sent by another base station, to determine validity of an identity of the drone UE. For example, in a scenario in which the drone UE performs cell (or location area) handover, a base station of a cell currently served by the drone UE (namely, a base station of a source cell) determines that the drone UE hands over from the current source cell to a target cell. The indication information may be further included in a handover request message, and the handover request message is sent by the base station of the source cell to a base station of the target cell, namely, a current base station. The indication information may include a location area identity (a space domain location area and a ground location area have different location area identities) of the source cell before the cell handover. When the location area identity of the source cell indicates that the source cell is the space domain location area (the space domain location area may include a space domain cell or a space domain location area of a cell), it indicates that the identity of the drone UE is valid, and it is determined that the drone UE supports air communication. Optionally, the location area identity of the source cell may be sent by the base station of the source cell to the base station of the target cell, namely, the current base station, when the drone UE performs cell handover. Alternatively, the base station (for example, the base station of the target cell) may further receive a message that is sent by the base station of the source cell and that directly indicates whether the drone UE supports the air communication. For example, one bit may be used for indication, where 0 (1) indicates that the drone UE does not support the air communication, and 1 (0) indicates that the drone UE supports the air communication. This is not limited in this application.

Further optionally, if the base station does not receive the indication information sent by the drone UE or another device such as the MME, the base station may further request the indication information of the drone UE from the drone UE. For example, if the indication information is capability information of the drone UE (for example, the indication information is predefined as capability information of the terminal, that is, whether the terminal supports the air communication is determined by using the capability information of the terminal), and the initial context setup request message does not include the capability information, the base station may further request the capability information from the drone UE. For example, the base station may request the capability information by sending a UE capability enquiry (UE capability enquiry) message to the drone UE. After receiving the UE capability enquiry message, the drone UE may return UE capability information (capability information) to the base station. Therefore, the base station may determine, based on the capability information, whether the drone UE supports the air communication, to determine whether the drone UE is allowed to access the current network.

205. The base station determines, based on the indication information, whether the drone UE is allowed to access a network.

Specifically, the base station may determine, based on the indication information, whether the drone UE supports the air communication. If the drone UE supports the air communication, it indicates that an identity of the drone UE is valid, and it is determined that the drone UE is allowed to access the network. Therefore, the drone UE may access the current network, that is, step 206 may be performed.

206. The drone UE accesses the network.

Further optionally, if it is determined, based on the indication information, that the drone UE does not support the air communication, the base station may further determine, with reference to other information, whether the identity of the drone UE is valid, for example, perform determining with reference to height information of the drone UE or with reference to a location area identity of a location of the drone UE.

In an optional implementation, the base station may obtain the height information of the drone UE, and may compare the height information with a preset height threshold (namely, a first height threshold). When the height value indicated by the height information exceeds the first height threshold, and the indication information indicates that the drone UE does not support the air communication, the base station may determine that the identity of the drone UE is invalid, and the drone UE is prohibited from accessing the current network. Optionally, the height information may be sent by the drone UE to the base station. For example, the drone UE may include the height information in the attach request and send the attach request to the base station. Specifically, the height information may be explicitly carried in the RRC connection setup complete message, or may be carried in another existing message or a newly added message. This is not limited in this application. Alternatively, the base station may further send, to the drone UE, a command for reporting the height information, so that the drone UE may send the command to the base station after receiving the command for reporting the height information sent by the base station. For example, the base station may send, to the drone UE, the command for reporting the height information in the RRC connection setup message, or include the command in another existing message or a newly added message for sending. This is not limited in this application. After receiving the command for reporting the height information, the drone UE may send the height information to the base station, for example, include the height information in the RRC connection setup complete message, and send the RRC connection setup complete message to the base station. Alternatively, the height information may be obtained through measurement by the base station. This is not limited in this application. Further optionally, the height information may be an absolute height, or may be a relative height. Details are not described herein again.

Optionally, the height information is obtained through measurement by using various measurement technologies. For example, the height information may be obtained through measurement by using a satellite positioning technology, or the height information may be obtained through measurement by using a measurement drive test (Measurement Drive Test, MDT for short) technology. This is not limited in this application. The MDT measurement is used as an example. The base station may deliver a configuration message to the drone UE, to instruct the drone UE to report an MDT. After receiving the configuration message, the drone UE may perform MDT measurement, and report measurement data that includes the height information to the base station. Optionally, the measurement data further includes information such as longitude and latitude. Therefore, the base station may determine, by using the obtained height information, whether the drone UE is in the space domain or on the ground. For example, the height value indicated by the height information is compared with a preset height threshold (namely, a first height threshold), to determine the height of the drone UE. Specifically, when the height value is higher than the threshold, the base station determines that the drone UE is in the space domain, and when the height value is lower than or equal to the threshold, the base station determines that the drone UE is on the ground. The first height threshold may be obtained through preconfiguration.

Further optionally, the configuration message used in this embodiment of this application may be higher layer signaling such as a system message or a broadcast message, RRC signaling, or MAC signaling. Alternatively, optionally, the configuration message may be physical layer signaling such as DCI signaling. This is not limited in this application.

In an optional implementation, the base station may further obtain a location area identity of the location of the drone UE, and may determine, based on the location area identity, the location area at which the drone UE is located. When the obtained location area identity is an identity of the space domain location area, that is, the location area identity indicates that the location of the drone UE is in the space domain location area, and the indication information indicates that the drone UE does not support the air communication, the base station may determine that the drone UE is prohibited from accessing the current network. Optionally, the location area identity such as the TAI may be carried in the attach request, so that the drone UE may send the location area identity to the base station in an attach request process. For example, the location area identity may be explicitly carried in the RRC connection setup complete message.

Optionally, a cell covered by the space domain of the base station and a cell covered by the ground may be different cells, that is, the space domain cell covered by the space domain and the ground cell covered by the ground have different location area identities; alternatively, a cell covered by the space domain and a cell covered by the ground may be the same cell, but are located in different location areas of one cell, and a space domain location area covered by the space domain and a ground location area covered by the ground have different location area identities; alternatively, a cell covered by the space domain and a cell covered by the ground may be the same cell, that is, the space domain cell and the ground cell have the same location area identity. Further optionally, the location area identity may be the TAI, a cell identity, or the like. Therefore, in a scenario in which the cell covered by the space domain of the base station and the cell covered by the ground are different cells or are located in different location areas in one cell, when the location area identity indicates that the location of the drone UE is the space domain location area, for example, is located in the space domain cell (the space domain cell and the ground cell are different) or is the space domain location area in the cell (the cell may include the space domain location area and the ground location area, that is, the space domain cell and the ground cell are the same cell), and the indication information indicates that the drone UE does not support the air communication, the base station may determine that the identity of the drone UE is invalid, that is, determine that the drone UE is prohibited from accessing the current network.

Further optionally, a network side such as a base station may further deliver a height threshold, namely, a second height threshold, where the second height threshold is used by the terminal to distinguish the location area identity of a space domain location area (including a space domain cell or a space domain location area in a cell) or the location area identity of the ground location area (including a ground cell or a ground location area in a cell). Therefore, when reporting the location area identity, the terminal such as the drone UE may compare the height information of the terminal with the second height threshold, and may send the location area identity of the space domain location area when the height information of the terminal is higher than the second height threshold; and send the location area identity of the ground location area when the height information of the terminal is lower than or equal to the second height threshold. The height value indicated by the height information may be a relative height or an absolute height, and a manner of determining the height value is the same as a manner of determining the second height threshold. Details are not described herein again. Further, the second height threshold may be the same as or different from the foregoing first height threshold. This is not limited in this application.

In other words, when determining, based on the indication information, that the drone UE is allowed to access the network, the network device such as the base station may perform the determining based on any one or more of the capability information, the flight certificate, and the subscription information. For example, when obtaining the capability information of the drone UE that is used to indicate that the drone UE supports the air communication, or when learning that the drone UE has the flight certificate, or when learning that the drone UE has the subscription information in the current network, the base station may determine that the drone UE supports the air communication, that is, the drone UE is allowed to access the current network, so that the drone UE may access the network for communication. Otherwise, if the base station does not obtain the capability information of the drone UE (or obtains the capability information that is used to indicate that the drone UE does not support the air communication), does not learn that the drone UE has the flight certificate, and does not learn that the drone UE has the subscription information in the current network, that is, when the indication information obtained by the base station indicates that the drone UE does not support the air communication, the base station may further perform determining with reference to the height information of the drone UE or the location area identity of the location of the drone UE. When the height value indicated by the height information exceeds a preset height threshold or the location area identity of the location of the drone UE indicates that the location of the drone UE is the space domain location area, the base station determines that the identity of the drone UE is invalid, and that the drone UE is not allowed to access the current network. The drone UE fails to access the network.

Further optionally, the indication information may be associated with an identity of one cell or identities of a plurality of cells, or may be associated with an identity of one location area or identities of a plurality of location areas, and is used to indicate a space domain cell or a space domain location area in which the terminal such as the drone UE supports communication. Therefore, the base station may obtain the identity of the current cell (or location area), and determine whether the identity of the current cell (or location area) matches the identity of the cell (or location area) associated with the indication information. When the identities match and the indication information indicates that the air communication is supported, the base station may determine that the terminal such as the drone UE supports communication in the current cell.

Optionally, if the identity of the drone UE is valid, that is, when it is determined that the drone UE is allowed to access the current network, the drone UE may continue an attach process, complete a secure activation process of an access layer, and access the network. Otherwise, if the identity of the drone UE is invalid, the attach process may end. For example, the base station may send an initial context setup failure (initial context setup failure) message to the MME.

Further optionally, when determining that the drone UE is prohibited from accessing the current network, that is, when determining that the identity of the drone UE is invalid, the base station may further report an access prohibition message that carries the identity of the drone UE to a supervision system such as the foregoing service supervision platform.

In this embodiment, the base station may receive indication information sent by the MME, and when the indication information indicates that the drone UE supports the air communication, determine that the identity of the drone UE is valid, that is, determine that the drone UE is allowed to access the network in which the network device is located. Otherwise, the base station may further determine, with reference to the height information of the drone UE or the location area identity of the location of the drone UE, whether the identity of the drone UE is valid, and when the identity of the drone UE is invalid, for example, when a height value indicated by the height information exceeds a preset height threshold and the indication information indicates that the drone UE does not support the air communication, or when the location area identity of the location of the drone UE indicates that the location of the drone UE is the space domain location area and the indication information indicates that the drone UE does not support the air communication, the base station determines that the drone UE is prohibited from accessing the network. Therefore, the quantity of unmanned aerial vehicle terminals that access the network can be limited, reducing interference caused by the unmanned aerial vehicle terminals to another terminal in the same network as the unmanned aerial vehicle terminals, and improving communication quality of the another terminal.

Figure 5:
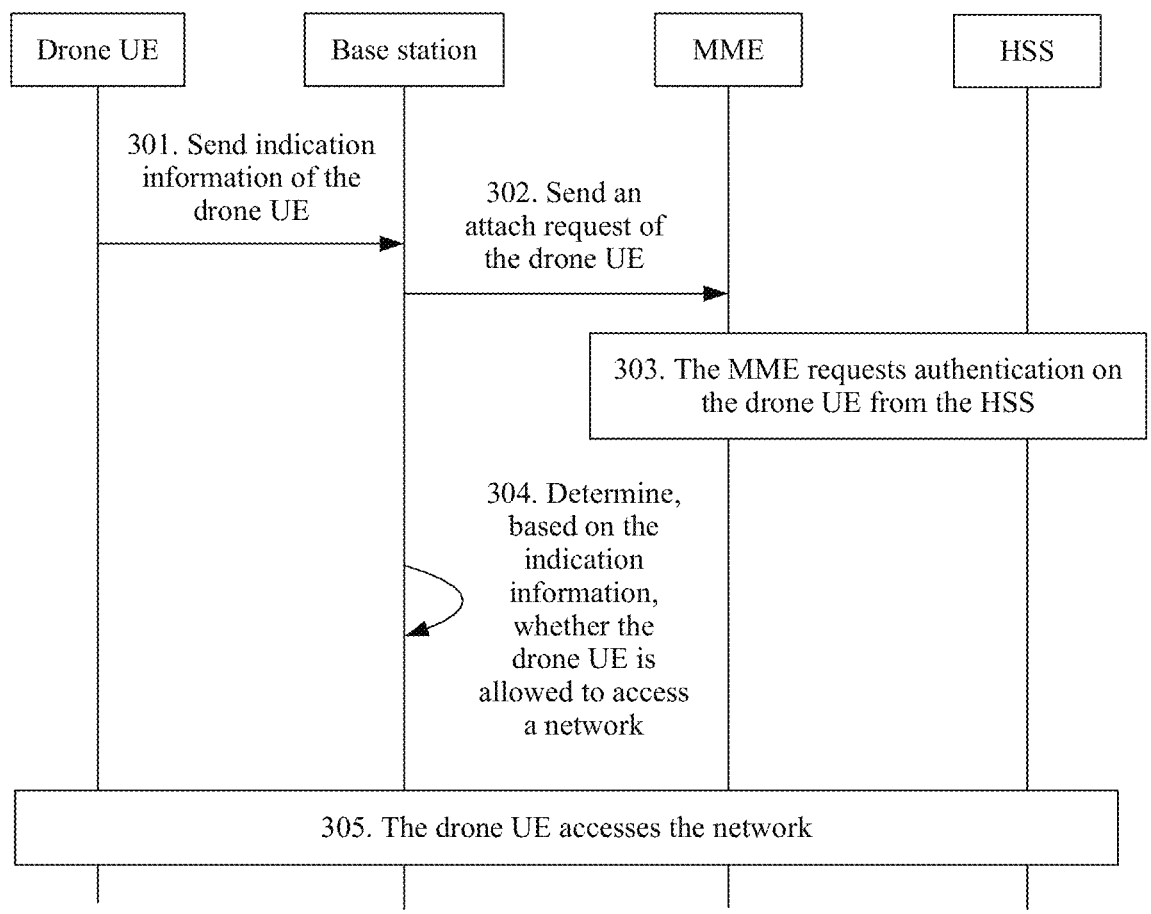
FIG. 5 is a schematic interaction diagram of a network access method according to an embodiment of this application.

FIG. 5 is a schematic interaction diagram of another network access method according to an embodiment of this application. Specifically, the following uses an example in which a terminal is an unmanned aerial vehicle terminal (also referred to as Drone UE), and a network device is a base station for detailed description. As shown in FIG. 5, the network access method in this embodiment of this application may include the following steps.

301. The drone UE sends indication information of drone UE to a base station.

Specifically, when the drone UE needs to access a current network for communication, the drone UE may initiate a random access request to the base station, to initiate a random access process. After receiving the request, the base station initiates an RRC connection setup (RRC connection setup) message to the drone UE. After receiving the RRC connection setup message, the drone UE may return an RRC connection setup complete (RRC connection setup complete) message to the base station. The current network may be a network in which the base station is located.

For example, the random access process initiated by the drone UE includes the following steps:

Msg1: The drone UE randomly selects a preamble (Preamble), and sends the preamble to the base station on a physical random access channel (Physical Random Access Channel, PRACH for short).

Msg 2: The base station receives the preamble, and sends a random access response to the drone UE. The random access response may include at least one type of the following information: a number of the received preamble, a time adjustment amount corresponding to the received preamble, uplink resource location indication information allocated to the drone UE, and the like.

Msg 3: After receiving the random access response, the drone UE sends an uplink message on the allocated uplink resource based on an indication of the base station. The uplink message may include a unique ID (identity) of the drone UE. For example, the unique ID may be a temporary mobile subscriber identity (Temporary Mobile Subscriber Identity, TMSI for short) or a random (Random) ID.

Msg 4: The base station receives the uplink message of the UE, and returns a contention resolution message to the drone UE that successfully accesses. The contention resolution message may include a unique ID of the terminal that successfully accesses. For example, the unique ID may be the TMSI or the random ID.

Optionally, the indication information of the drone UE may be included in the random access request. For example, the indication information may be a sequence, and the sequence may be used to indicate whether the drone UE is an unmanned aerial vehicle terminal that supports the air communication. For example, in a standard, a special sequence may be defined for the unmanned aerial vehicle terminal that supports the air communication, for example, a current sequence is classified into two types: one type of the current sequence is dedicated for the unmanned aerial vehicle terminal that supports the air communication, and the other type of the current sequence is used for another terminal (including a common terminal and an unmanned aerial vehicle terminal that does not support the air communication). Optionally, the sequence may be carried in the random access process, and be reported to the base station. For example, the sequence may be a preamble sequence, and the drone UE may send the preamble sequence to the base station in Msg1. For another example, the sequence may be a special defined UE ID. The drone UE may send the UE ID to the base station in Msg3 or the RRC connection setup complete message. This is not listed one by one herein.

302. The base station sends the attach request of the drone UE to the MME.

Further, after the random access, the drone UE may send the attach request (attach request) to the base station, and the base station may forward the attach request message to a device such as the MME in a core network. Optionally, the attach request message may be included in the RRC connection setup complete message.

Optionally, the indication information of the drone UE may also be included in the attach request message. For example, the indication information may be at least one type of information: capability information, a flight certificate, and the like, and is used to indicate whether the drone UE supports the air communication.

Further, after receiving the attach request message, the base station may forward the attach request message to the device such as the MME in the core network. Optionally, the forwarded attach request message may be included in an initial UE message sent by the base station to the MME.

303. The MME requests authentication on the drone UE from an HSS.

Specifically, after receiving the initial UE message, the MME obtains an authentication vector from the HSS to which the user subscribes, and completes network authentication with the drone UE. In addition, a process such as security authentication is performed on the drone UE, and a location update process and a session establishment process may be performed after the authentication process and the security authentication process. For the authentication process, the security authentication process, the location update process, and the session establishment process, refer to related descriptions in the prior art. Details are not described herein again.

304. The base station determines, based on the indication information, whether the drone UE is allowed to access a network.

305. The drone UE accesses the network.

Optionally, if the random access request does not carry the indication information and the attach request does not carry the indication information, the base station may further request the indication information from the drone UE. After receiving the request, the drone UE may send the indication information to the base station, so that the base station can obtain the indication information of the drone UE, and determine, based on the indication information, whether the drone UE supports the air communication.

Specifically, after receiving the indication information sent by the drone UE, the base station may determine, based on the indication information, whether the drone UE supports the air communication. If the drone UE supports the air communication, for example, the base station may determine, when receiving the sequence, the capability information, or the flight certificate sent by the drone UE, that the drone UE supports the air communication, it indicates that the identity of the drone UE is valid, and it may be determined that the drone UE is allowed to access the network. Therefore, the drone UE may access the current network, that is, step 305 may be performed.

Further optionally, in a scenario in which the drone UE performs cell (or location area) handover, for example, a base station (namely, a base station of a source cell) of a cell currently served by the drone UE determines that the drone UE hands over from the current source cell to the target cell, and the indication information of the source cell may be further included in a handover request message and be sent by the base station of the source cell to the base station of the target cell. The base station of the target cell determines validity of the drone UE. For example, the indication information includes a location area identity of the source cell (a space domain location area and a ground location area have different location area identities). When a location area identity of the source cell indicates that the source cell is the space domain location area (the space domain location area may include a space domain cell or a space domain location area of a cell), it indicates that the identity of the drone UE is valid. The base station of the target cell may determine that the drone UE supports the air communication, and the drone UE is allowed to access the network. Alternatively, the base station of the source cell may directly notify the base station of the target cell whether the drone UE supports the air communication. This is not limited in this application.

Further optionally, if it is determined, based on the indication information, that the drone UE does not support the air communication, the base station may further determine, with reference to other information, whether the identity of the drone UE is valid, for example, perform determining with reference to height information of the drone UE or with reference to the location area identity of the location of the drone UE. Specifically, for a manner in which the base station determines, based on the indication information and with reference to the height information of the drone UE or with reference to the location area identity of the location of the drone UE, whether the drone UE is allowed to access the network, refer to related descriptions in the embodiment shown in FIG. 4. Details are not described herein again.

Optionally, if the identity of the drone UE is valid, that is, when it is determined that the drone UE is allowed to access the current network, the drone UE may continue an attach process, complete a secure activation process of an access layer, and access the network. Otherwise, if the identity of the drone UE is invalid, the attach process may end. For example, the base station may send an initial context setup failure message to the MME.

In this embodiment, the base station may receive the indication information sent by the drone UE, and when the indication information indicates that the drone UE supports the air communication, determine that the identity of the drone UE is valid, that is, determine that the drone UE is allowed to access the network in which the network device is located. Otherwise, the base station may further determine, with reference to the height information of the drone UE or the location area identity of the location of the drone UE, whether the identity of the drone UE is valid, and when the identity of the drone UE is invalid, for example, when a height value indicated by the height information exceeds a preset height threshold and the indication information indicates that the drone UE does not support the air communication, or when the location area identity of the location of the drone UE indicates that the location of the drone UE is the space domain location area and the indication information indicates that the drone UE does not support the air communication, the base station determines that the drone UE is prohibited from accessing the network. Therefore, the quantity of unmanned aerial vehicle terminals that access the network can be limited, reducing interference caused by the unmanned aerial vehicle terminals to another terminal in the same network as the unmanned aerial vehicle terminals, and improving communication quality of the another terminal.

Figure 6:
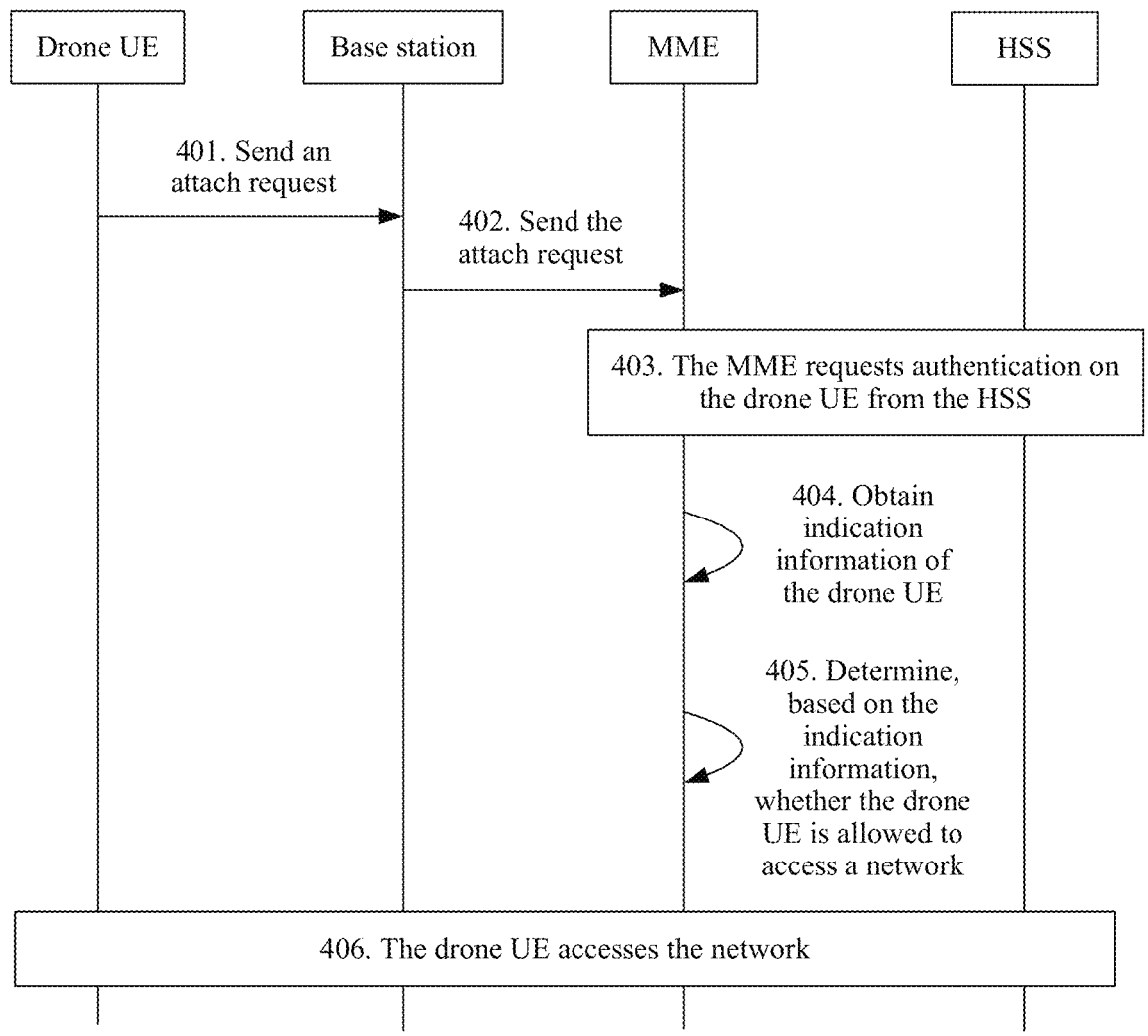
FIG. 6 is a schematic interaction diagram of a network access method according to an embodiment of this application.

FIG. 6 is a schematic interaction diagram of still another network access method according to an embodiment of this application. Specifically, the following uses an example in which a terminal is an unmanned aerial vehicle terminal (also referred to as Drone UE), and a network device is an MME for detailed description. As shown in FIG. 6, the network access method in this embodiment of this application may include the following steps.

401. The drone UE sends an attach request to a base station.

Specifically, when the terminal such as the drone UE needs to access a current network for communication, the drone UE may initiate a random access request to the base station. After receiving the request, the base station initiates an RRC connection setup message to the drone UE. After receiving the RRC connection setup message, the drone UE may return an RRC connection setup complete (RRC connection setup complete) message to the base station. Optionally, the attach request (attach request) message may be included in the RRC connection setup complete message. The current network may be a network in which the base station is located.

402. The base station sends the attach request to the MME.

403. The MME requests authentication on the drone UE from an HSS.

Specifically, after receiving the attach request message, the base station may forward the attach request message to a device such as the MME in a core network. Optionally, the forwarded attach request message may be included in an initial UE message sent by the base station to the MME. Further, after receiving the initial UE message, the MME obtains an authentication vector from the HSS to which the user subscribes, and completes network authentication with the drone UE. In addition, a process such as security authentication is performed on the drone UE, and a location update process and a session establishment process may be performed after the authentication process and the security authentication process. For the authentication process, the security authentication process, the location update process, and the session establishment process, refer to related descriptions in the prior art. Details are not described herein again.

404. The MME obtains indication information of the drone UE.

Optionally, the indication information of the drone UE may be sent by the drone UE to the base station and is forwarded by the base station to the MME. For example, when the indication information is a sequence, the indication information may be included in the random access request sent by the drone UE to the base station. For another example, when the indication information is capability information or a flight certificate, the indication information may be included in the attach request sent by the drone UE to the base station. Alternatively, the indication information of the drone UE may be sent by the drone UE to the MME. For example, the drone UE may send the indication information to the MME by using a non-access stratum (Non-access stratum, NAS for short) message. Alternatively, the indication information of the drone UE may be obtained by the MME from the HSS, for example, the indication information is subscription information.

405. The MME determines, based on the indication information, whether the drone UE is allowed to access a network.

406. The drone UE accesses the network.

Specifically, after obtaining the indication information of the drone UE, the MME may determine, based on the indication information, whether the drone UE supports the air communication. If the drone UE supports the air communication, for example, the MME may determine, when obtaining the sequence, the capability information, the flight certificate, or the subscription information of the drone UE, that the drone UE supports the air communication, it indicates that the identity of the drone UE is valid, and it may be determined that the drone UE is allowed to access the network. Therefore, the drone UE may access the current network, that is, step 406 may be performed.

Further optionally, if it is determined, based on the indication information, that the drone UE does not support the air communication, the MME may further determine, with reference to other information, whether the identity of the drone UE is valid, for example, perform determining with reference to height information of the drone UE or with reference to a location area identity of a location of the drone UE. Optionally, the height information and/or the location area identity may be included in a NAS message sent by the drone UE to the MME, or the height information and/or the location area identity may be sent by the drone UE to the base station, and may be forwarded by the base station to the MME. This is not limited in this application. Specifically, a manner in which the MME determines, based on the indication information and with reference to the height information of the drone UE or the location area identity of the location of the drone UE, whether the drone UE is allowed to access the network is similar to a manner in which the base station determines, based on the indication information and with reference to the height information of the drone UE or the location area identity of the location of the drone UE, whether the drone UE is allowed to access the network. For details, refer to related descriptions in the embodiment shown in FIG. 4. Details are not described herein again.

In this embodiment, the MME may obtain indication information of the drone UE, and when the indication information indicates that the drone UE supports the air communication, determine that the identity of the drone UE is valid, that is, determine that the drone UE is allowed to access the network in which the network device is located. Otherwise, the MME may further determine, with reference to height information of the drone UE or a location area identity of a location of the drone UE, whether the identity of the drone UE is valid, and when the identity of the drone UE is invalid, for example, when a height value indicated by the height information exceeds a preset height threshold and the indication information indicates that the drone UE does not support the air communication, or when the location area identity of the location of the drone UE indicates that the location of the drone UE is a space domain location area and the indication information indicates that the drone UE does not support the air communication, the MME determines that the drone UE is prohibited from accessing the network. Therefore, the quantity of unmanned aerial vehicle terminals that access the network can be limited, reducing interference caused by the unmanned aerial vehicle terminals to another terminal in the same network as the unmanned aerial vehicle terminals, and improving communication quality of the another terminal.

The foregoing method embodiments are an example of the network access method in this application. The description of each embodiment has respective focuses. For a part that is not described in detail in an embodiment, refer to related descriptions in other embodiments.

Figure 7:
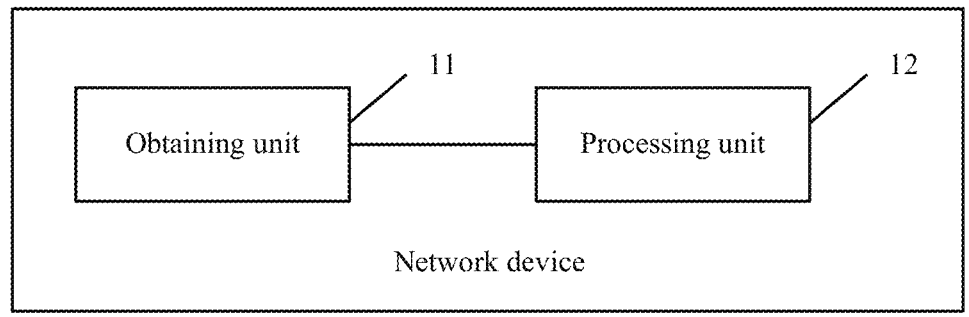
FIG. 7 is a schematic structural diagram of a network device according to an embodiment of this application.

FIG. 7 is a schematic structural diagram of a network device according to an embodiment of this application. Specifically, as shown in FIG. 7, the network device in this embodiment of this application may include an obtaining unit 11 and a processing unit 12.

The obtaining unit 11 is configured to obtain indication information, where the indication information is used to indicate whether the terminal supports air communication.

The processing unit 12 is configured to determine, when the indication information indicates that the terminal supports the air communication, that the terminal is allowed to access a network in which the network device is located.

Further, in an optional embodiment, the obtaining unit 11 may be further configured to obtain height information of the terminal; and the processing unit 12 may be further configured to determine, when a height value indicated by the height information exceeds a preset height threshold, and the indication information indicates that the terminal does not support the air communication, that the terminal is prohibited from accessing the network in which the network device is located.

Further, in an optional embodiment, the space domain location area and the ground location area have different location area identities.

The obtaining unit 11 may be further configured to obtain a location area identity of a location of the terminal.

The processing unit 12 may be further configured to determine, when the location area identity indicates that the location of the terminal is in the space domain location area, and the indication information indicates that the terminal does not support the air communication, that the terminal is prohibited from accessing the network in which the network device is located.

Optionally, when obtaining the indication information, the obtaining unit 11 may be specifically configured to:

receive capability information from the terminal, where the capability information is used to indicate that the terminal supports the air communication.

Optionally, when obtaining the indication information, the obtaining unit 11 may be specifically configured to:

receive a sequence from the terminal, where the sequence is used to indicate whether the terminal is an unmanned aerial vehicle terminal that supports the air communication; and the processing unit 12 may be further configured to determine, when the sequence indicates that the terminal is an unmanned aerial vehicle terminal that supports the air communication, that the terminal supports the air communication.

Optionally, when obtaining the indication information, the obtaining unit 11 may be specifically configured to:

detect whether the terminal has a flight certificate, where the flight certificate is used to authorize communication of the terminal in a space domain; and the processing unit 12 may be further configured to determine, when the terminal has the flight certificate, that the terminal supports the air communication.

Optionally, when obtaining the indication information, the obtaining unit 11 may be specifically configured to:

detect whether the terminal has subscription information in the network in which the network device is located; and the processing unit 12 may be further configured to determine, when the terminal has the subscription information, that the terminal supports the air communication.

Optionally, the space domain location area and the ground location area have different location area identities. When obtaining the indication information, the obtaining unit 11 may be specifically configured to:

obtain, when the terminal performs cell handover, a location area identity of a source cell before the terminal performs cell handover; and the processing unit 12 may be further configured to determine, when the location area identity of the source cell indicates that the source cell is a space domain location area, that the terminal supports the air communication.

Optionally, the network device may implement, by using the foregoing units, some or all of the steps performed by the network device such as a base station or an MME in the foregoing network access methods in the embodiments shown in FIG. 3 to FIG. 6. It should be understood that this embodiment of this application is an apparatus embodiment corresponding to the method embodiments, and the descriptions of the method embodiments are also applicable to this embodiment of this application.

Figure 8:
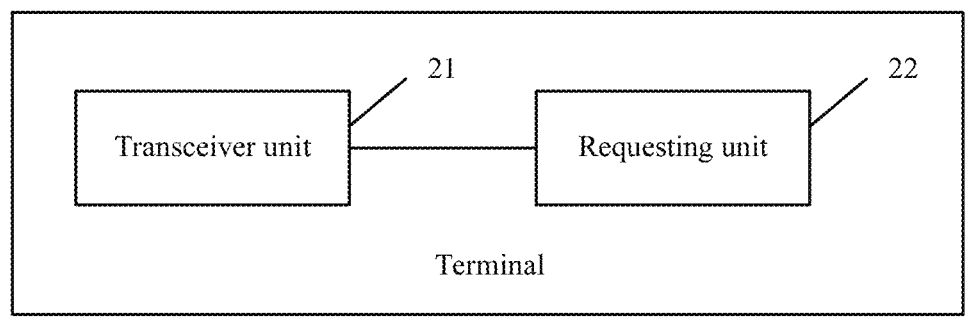
FIG. 8 is a schematic structural diagram of a terminal according to an embodiment of this application.

FIG. 8 is a schematic structural diagram of a terminal according to an embodiment of this application. Specifically, as shown in FIG. 8, the terminal in this embodiment of this application may include a transceiver unit 21 and a requesting unit 22.

The transceiver unit 21 is configured to send indication information to a network device, where the indication information is used to indicate whether the terminal supports air communication.

The requesting unit 22 is configured to request to access a network in which the network device is located.

Further, in an optional embodiment, the transceiver unit 21 is further configured to send height information to the network device.

When a height value indicated by the height information exceeds a preset height threshold, and the indication information indicates that the terminal does not support the air communication, the terminal is prohibited from accessing the network in which the network device is located.

Further, in an optional embodiment, the transceiver unit 21 may be further configured to send the location area identity of the location of the terminal to the network device.

When the location area identity indicates that the location of the terminal is in the space domain location area, and the indication information indicates that the terminal does not support the air communication, the terminal is prohibited from accessing the network in which the network device is located.

Optionally, the indication information includes a sequence, where the sequence is used to indicate whether the terminal is an unmanned aerial vehicle terminal that supports the air communication.

Optionally, the indication information includes capability information, where the capability information is used to indicate that the terminal supports the air communication.

Optionally, the indication information includes a flight certificate, where the flight certificate is used to authorize communication of the terminal in a space domain.

Optionally, the terminal may implement, by using the foregoing units, some or all of the steps performed by the terminal such as the drone UE in the foregoing network access methods in the embodiments shown in FIG. 3 to FIG. 6. It should be understood that this embodiment of this application is an apparatus embodiment corresponding to the method embodiments, and the descriptions of the method embodiments are also applicable to this embodiment of this application.

In this embodiment, the network device may determine, by obtaining the indication information that is used to indicate whether the terminal supports the air communication, and when the indication information indicates that the terminal supports the air communication, that an identity of the terminal is valid, that is, determine that the terminal is allowed to access the network in which the network device is located, so that the network device may determine, based on the indication information, whether the terminal is allowed to communicate in the space domain. The quantity of unmanned aerial vehicle terminals that access the network is limited, reducing interference caused by the unmanned aerial vehicle terminals to another terminal in the same network as the unmanned aerial vehicle terminals, and improving communication quality of the another terminal.

Figure 9:
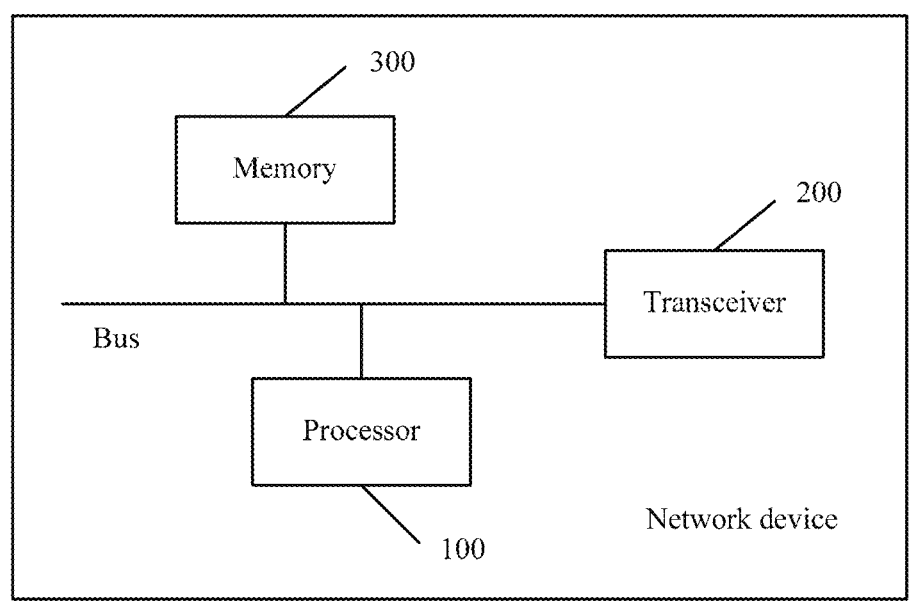
FIG. 9 is a schematic structural diagram of another network device according to an embodiment of this application.

FIG. 9 is a schematic structural diagram of another network device according to an embodiment of this application. Specifically, as shown in FIG. 9, the network device in this embodiment of this application may include: a transceiver 200 and a processor 100. The processor 100 is connected to the transceiver 200. Optionally, the network device further includes a memory 300. The memory 300 may be connected to the processor 100.

The transceiver 200, the memory 300, and the processor 100 may establish a data connection to each other by using a bus, or in another manner. Connection by using the bus is described in this embodiment.

The processor 100 may be a central processing unit (Central Processing Unit, CPU for short), a network processor (Network Processor, NP for short), or a combination of the CPU and the NP.

The processor 100 may further include a hardware chip. The hardware chip may be an application-specific integrated circuit (Application-Specific Integrated Circuit, ASIC for short), a programmable logic device (Programmable Logic Device, PLD for short), or a combination thereof. The PLD may be a complex programmable logic device (Complex Programmable Logic Device, CPLD for short), a field-programmable gate array (Field-Programmable Gate Array, FPGA for short), generic array logic (Generic Array Logic, GAL for short), or any combination thereof.

The memory 300 may include a volatile memory (Volatile Memory), for example, a random-access memory (Random-Access Memory, RAM for short). The memory 300 may also include a non-volatile memory (non-volatile memory), for example, a flash memory (flash memory), a hard disk (Hard Disk Drive, HDD for short), or a solid-state drive (Solid-State Drive, SSD for short). The memory 300 may further include a combination of the foregoing types of memories.

The network device may be a base station, or may be a core network device such as an MME. Optionally, the memory 300 may be configured to store a program instruction. The processor 100 may perform one or more steps or an optional implementation in the embodiments shown in FIG. 3 to FIG. 6 by invoking the program instruction stored in the memory 300, so that the network device implements a function of the foregoing method. For example, the network device may implement, by using the foregoing components, some or all of the steps performed by the network device such as the base station or the MME in the foregoing network access methods in the embodiments shown in FIG. 3 to FIG. 6.

Specifically, the processor 100 may be configured to: obtain indication information, where the indication information is used to indicate whether the terminal supports the air communication; and when the indication information indicates that the terminal supports the air communication, determine that the terminal is allowed to access the network in which the network device is located.

Optionally, the processor 100 is further configured to: obtain height information of the terminal, for example, invoke the transceiver 200 to receive the height information sent by the terminal; and determine, when the height value indicated by the height information exceeds the preset height threshold, and the indication information indicates that the terminal does not support the air communication, that the terminal is prohibited from accessing the network in which the network device is located.

Optionally, a space domain location area and a ground location area have different location area identities. The processor 100 is further configured to: obtain a location area identity of a location of the terminal, for example, invoke the transceiver 200 to receive the location area identity sent by the terminal; and determine, when the location area identity indicates that the location of the terminal is in the space domain location area, and the indication information indicates that the terminal does not support the air communication, that the terminal is prohibited from accessing the network in which the network device is located.

Optionally, when obtaining the indication information, the processor 100 may be specifically configured to: invoke the transceiver 200 to receive capability information from the terminal, where the capability information is used to indicate that the terminal supports the air communication.

Optionally, when obtaining the indication information, the processor 100 may be specifically configured to: invoke the transceiver 200 to receive a sequence from the terminal, where the sequence is used to indicate whether the terminal is an unmanned aerial vehicle terminal that supports the air communication. When the sequence indicates that the terminal is an unmanned aerial vehicle terminal that supports the air communication, the network device determines that the terminal supports the air communication.

Optionally, when obtaining the indication information, the processor 100 may be specifically configured to: detect whether the terminal has a flight certificate, for example, may invoke the transceiver 200 to receive the flight certificate sent by the terminal or another device such as the MME, where the flight certificate is used to authorize communication of the terminal in a space domain; and determine, when the terminal has the flight certificate, that the terminal supports the air communication.

Optionally, when obtaining the indication information, the processor 100 may be specifically configured to: detect whether the terminal has subscription information on a network in which the network device is located, for example, may invoke the transceiver 200 to receive the subscription information sent by the MME, and determine, when the terminal has the subscription information, that the terminal supports the air communication.

Optionally, a space domain location area and a ground location area have different location area identities. When obtaining the indication information, the processor 100 may be specifically configured to: obtain, when the terminal performs cell handover, a location area identity of a source cell before the terminal performs cell handover, for example, invoke the transceiver 200 to receive the location area identity of the source cell sent by the terminal; and determine, when the location area identity of the source cell indicates that the source cell is the space domain location area, that the terminal supports the air communication.

Figure 10:
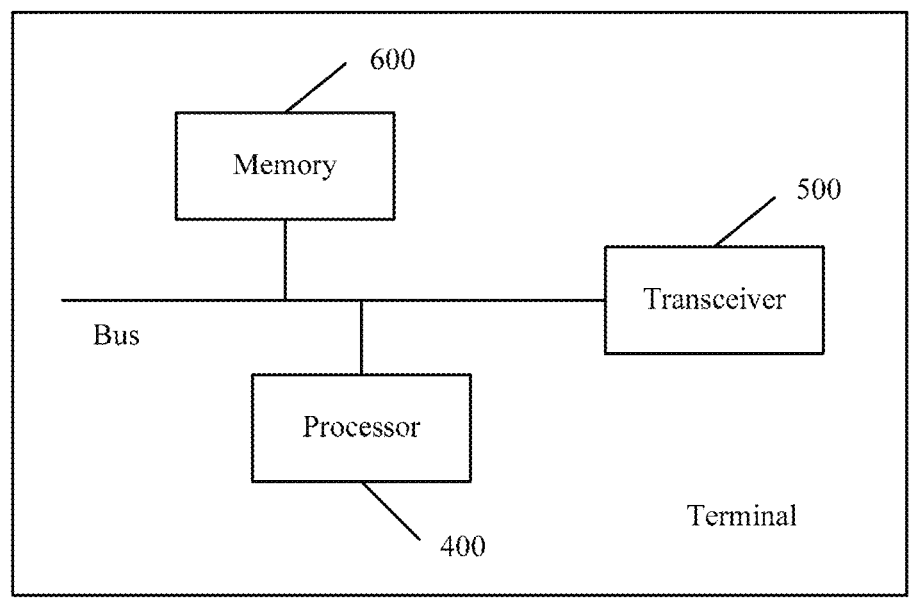
FIG. 10 is a schematic structural diagram of another terminal according to an embodiment of this application.

FIG. 10 is a schematic structural diagram of another terminal according to an embodiment of this application. Specifically, as shown in FIG. 10, the terminal in this embodiment of this application may include: a transceiver 500 and a processor 400. The processor 400 is connected to the transceiver 500. Optionally, the terminal further includes a memory 600. The memory 600 may be connected to the processor 400.

The transceiver 500, the memory 600, and the processor 400 may establish a data connection to each other by using a bus, or in another manner. Connection by using the bus is described in this embodiment.

The processor 400 may be a CPU, an NP, or a combination of the CPU and the NP.

The processor 400 may further include a hardware chip. The hardware chip may be an ASIC, a PLD, or a combination thereof. The PLD may be a CPLD, an FPGA, a GAL, or any combination thereof.

The memory 600 may include a volatile memory (Volatile Memory), for example, a RAM. The memory 600 may also include a non-volatile memory (non-volatile memory), for example, a flash memory (flash memory), an HDD, or an SSD. The memory 600 may further include a combination of the foregoing types of memories.

Optionally, the memory 600 may be configured to store a program instruction. The processor 400 may perform one or more steps or an optional implementation in the embodiments shown in FIG. 3 to FIG. 6 by invoking the program instruction stored in the memory 600, so that the terminal implements a function of the foregoing method. For example, the terminal may implement, by using the foregoing components, some or all of the steps performed by the terminal such as the drone UE in the foregoing network access methods in the embodiments corresponding to FIG. 3 to FIG. 6.

Specifically, the processor 400 may be configured to: invoke the transceiver 500 to send indication information to the network device, where the indication information is used to indicate whether the terminal supports the air communication; and request to access the network in which the network device is located.

Optionally, the processor 400 may be further configured to: invoke the transceiver 500 to send height information to the network device. When a height value indicated by the height information exceeds a preset height threshold, and the indication information indicates that the terminal does not support the air communication, the terminal is prohibited from accessing a network in which the network device is located.

Optionally, the processor 400 may be further configured to: invoke the transceiver 500 to send the location area identity of the location of the terminal to the network device. When the location area identity indicates that the location of the terminal is in the space domain location area, and the indication information indicates that the terminal does not support the air communication, the terminal is prohibited from accessing the network in which the network device is located.

Optionally, when sending the indication information to the network device, the processor 400 may be specifically configured to: invoke the transceiver 500 to send a sequence to the network device, where the sequence is used to indicate whether the terminal is an unmanned aerial vehicle terminal that supports the air communication.

Optionally, when sending the indication information to the network device, the processor 400 may be specifically configured to: invoke the transceiver 500 to send capability information to the network device, where the capability information is used to indicate that the terminal supports the air communication.

Optionally, when sending the indication information to the network device, the processor 400 may be specifically configured to: invoke the transceiver 500 to send a flight certificate to the network device, where the flight certificate is used to authorize communication of the terminal in a space domain.

In this application, the network device may determine, by obtaining indication information that is used to indicate whether the terminal supports the air communication, and when the indication information indicates that the terminal supports the air communication, that an identity of the terminal is valid, that is, determine that the terminal is allowed to access the network in which the network device is located, so that the network device may determine, based on the indication information, whether the terminal is allowed to communicate in the space domain. The quantity of unmanned aerial vehicle terminals that access the network is limited, reducing interference caused by the unmanned aerial vehicle terminals to another terminal in the same network as the unmanned aerial vehicle terminals, and improving communication quality of the another terminal.

In the foregoing embodiments, the description of each embodiment has respective focuses. For a part that is not described in detail in an embodiment, refer to related descriptions in other embodiments.

All or some of the foregoing embodiments may be implemented by software, hardware, firmware, or any combination thereof. When the software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) manner or a wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

What is claimed is:

1. A network access method, comprising:
    obtaining, by a network device, indication information, wherein the indication information indicates whether a terminal supports air communication and wherein a space domain location area and a ground location area have different location area identities;
    obtaining, by the network device, a location area identity of a location of the terminal and
    when the indication information indicates that the terminal supports the air communication, determining, by the network device, that the terminal is allowed to access a network in which the network device is located, or
    when the location area identity indicates that the location of the terminal is in the space domain location area, and the indication information indicates that the terminal does not support the air communication, determining, by the network device, that the terminal is prohibited from accessing the network in which the network device is located.

2. The method according to claim 1, wherein the method further comprises:
   obtaining, by the network device, height information of the terminal; and
   when a height value indicated by the height information exceeds a preset height threshold, and the indication information indicates that the terminal does not support the air communication, determining, by the network device, that the terminal is prohibited from accessing the network in which the network device is located.

3. The method according to claim 1, wherein the obtaining, by a network device, indication information comprises:
   receiving, by the network device, capability information from the terminal, wherein the capability information is used to indicate that the terminal supports the air communication.

4. The method according to claim 1, wherein the obtaining, by a network device, indication information comprises:
   receiving, by the network device, a sequence from the terminal, wherein the sequence is used to indicate whether the terminal is an unmanned aerial vehicle terminal that supports the air communication; and
   the method further comprises:
   when the sequence indicates that the terminal is the unmanned aerial vehicle terminal that supports the air communication, determining, by the network device, that the terminal supports the air communication.

5. The method according to claim 1, wherein the obtaining, by a network device, indication information comprises:
   detecting, by the network device, whether the terminal has a flight certificate, wherein the flight certificate is used to authorize communication of the terminal in a space domain; and
   the method further comprises:
   when the terminal has the flight certificate, determining, by the network device, that the terminal supports the air communication.

6. The method according to claim 1, wherein the obtaining, by a network device, indication information comprises:
   detecting, by the network device, whether the terminal has subscription information in the network in which the network device is located; and
   the method further comprises:
   when the terminal has the subscription information, determining, by the network device, that the terminal supports the air communication.

7. A network access method comprising:
   obtaining, by a network device, indication information, wherein the indication information indicates whether a terminal supports air communication;
   wherein a space domain location area and a ground location area have different location area identities;
   the obtaining, by a network device, indication information comprises:
   when the terminal performs cell handover, obtaining, by the network device, a location area identity of a source cell before the terminal performs cell handover; and
   the method further comprises:
   when the location area identity of the source cell indicates that the source cell is the space domain location area, determining, by the network device, that the terminal supports the air communication, and when the indication information indicates that the terminal supports the air communication, determining, by the network device, that the terminal is allowed to access a network in which the network device is located.

8. The method according to claim 7, wherein the obtaining, by the network device, indication information comprises:
   receiving, by the network device, capability information from the terminal, wherein the capability information is used to indicate that the terminal supports the air communication.

9. The method according to claim 7, wherein the obtaining, by the network device, indication information comprises:
   receiving, by the network device, a sequence from the terminal, wherein the sequence is used to indicate whether the terminal is an unmanned aerial vehicle terminal that supports the air communication; and
   the method further comprises:
   when the sequence indicates that the terminal is an unmanned aerial vehicle terminal that supports the air communication, determining, by the network device, that the terminal supports the air communication.

10. The method according to claim 7, wherein the obtaining, by the network device, indication information comprises:
    detecting, by the network device, whether the terminal has subscription information in the network in which the network device is located; and
    the method further comprises:
    when the terminal has the subscription information, determining, by the network device, that the terminal supports the air communication.

11. A network access method, comprising:
    sending, by a terminal, indication information to a network device, wherein the indication information is used to indicate whether the terminal supports air communication;
    requesting, by the terminal, to access a network in which the network device is located; and
    sending, by the terminal, a location area identity of a location of the terminal to the network device, wherein
    when the location area identity indicates that the location of the terminal is in a space domain location area, and the indication information indicates that the terminal does not support the air communication, the terminal is prohibited from accessing the network in which the network device is located.

12. The method according to claim 11, wherein the method further comprises:
    sending, by the terminal, height information to the network device, wherein
    when a height value indicated by the height information exceeds a preset height threshold, and the indication information indicates that the terminal does not support the air communication, the terminal is prohibited from accessing the network in which the network device is located.

13. The method according to claim 11, wherein the sending, by a terminal, indication information to a network device comprises:
    sending, by the terminal, a sequence to the network device, wherein the sequence is used to indicate whether the terminal is an unmanned aerial vehicle terminal that supports the air communication.

14. The method according to claim 11, wherein the sending, by a terminal, indication information to a network device comprises:

sending, by the terminal, capability information to the network device, wherein the capability information is used to indicate that the terminal supports the air communication.

15. The method according to claim 11, wherein the sending, by a terminal, indication information to a network device comprises:
sending, by the terminal, a flight certificate to the network device, wherein the flight certificate is used to authorize communication of the terminal in a space domain.

16. An apparatus, comprising: a processor and a memory, wherein
the memory stores instructions to be executed on the processor, to cause a terminal to perform:
sending indication information to a network device, wherein the indication information indicates whether the terminal supports air communication;
sending a location area identity of a location of the terminal to the network device; and
requesting to access a network in which the network device is located, and when the location area identity indicates that the location of the terminal is in a space domain location area, and the indication information indicates that the terminal does not support the air communication, the terminal is prohibited from accessing the network in which the network device is located.

17. The apparatus according to claim 16, wherein the memory further stores instructions executed by the processor, to cause the terminal to perform:
sending height information to the network device; and
when a height value indicated by the height information exceeds a preset height threshold, and the indication information indicates that the terminal does not support the air communication, the terminal is prohibited from accessing the network in which the network device is located.

18. The terminal according to claim 16, wherein the indication information comprises a sequence, and the sequence indicates whether the terminal is an unmanned aerial vehicle terminal that supports the air communication.

19. The terminal according to claim 16, wherein the indication information comprises capability information, and the capability information indicates that the terminal supports the air communication.

20. The terminal according to claim 16, wherein the indication information comprises a flight certificate, and the flight certificate is used to authorize communication of the terminal in a space domain.

* * * * *

UNITED STATES PATENT AND TRADEMARK OFFICE
CERTIFICATE OF CORRECTION

| | |
|---|---|
| PATENT NO. | : 11,115,901 B2 |
| APPLICATION NO. | : 16/675147 |
| DATED | : September 7, 2021 |
| INVENTOR(S) | : Xiaoli Shi et al. |

It is certified that error appears in the above-identified patent and that said Letters Patent is hereby corrected as shown below:

In the Specification

In Column 1, Line 10 (approx.), delete "2017," and insert -- 2017. --.

In the Claims

In Column 32, Line 13 (approx.), in Claim 18, delete "terminal" and insert -- apparatus --.

In Column 32, Line 17 (approx.), in Claim 19, delete "terminal" and insert -- apparatus --.

In Column 32, Line 21 (approx.), in Claim 20, delete "terminal" and insert -- apparatus --.

Signed and Sealed this
Thirty-first Day of May, 2022

Katherine Kelly Vidal
*Director of the United States Patent and Trademark Office*